United States Patent
Satoh

[11] Patent Number: 5,923,151
[45] Date of Patent: Jul. 13, 1999

[54] GENERATOR VOLTAGE REGULATING SYSTEM

[75] Inventor: Kiyokatsu Satoh, Kawagoe, Japan

[73] Assignee: Sanken Electric Co., Ltd., Saitama Ken, Japan

[21] Appl. No.: 09/057,696

[22] Filed: Apr. 9, 1998

[30] Foreign Application Priority Data

Apr. 16, 1997 [JP] Japan .................................. 9-114455

[51] Int. Cl.$^6$ ...................................................... H02H 7/06
[52] U.S. Cl. ............................................... 322/28; 322/19
[58] Field of Search ........................................ 322/19, 28

[56] References Cited

U.S. PATENT DOCUMENTS

| | | | |
|---|---|---|---|
| 4,388,586 | 6/1983 | Lamoth ...................................... | 322/28 |
| 4,388,587 | 6/1983 | Lamoth et al. ............................ | 322/28 |
| 4,486,702 | 12/1984 | Edwards ..................................... | 322/28 |
| 4,636,706 | 1/1987 | Bowman et al. .......................... | 322/28 |
| 5,140,253 | 8/1992 | Itoh ........................................... | 322/28 |
| 5,243,270 | 9/1993 | Mayumi et al. ........................... | 322/28 |
| 5,262,711 | 11/1993 | Mori et al. ................................. | 322/28 |
| 5,319,299 | 6/1994 | Maehara .................................... | 322/28 |
| 5,521,485 | 5/1996 | Vogelsberger ............................. | 322/28 |
| 5,637,986 | 6/1997 | Kanazawa et al. ........................ | 322/28 |

FOREIGN PATENT DOCUMENTS 0 421 332 A2   4/1991   European Pat. Off. .
54-30416    of 1997   Japan .

*Primary Examiner*—Nestor Ramirez
*Assistant Examiner*—Peter Medley
*Attorney, Agent, or Firm*—Woodcock Washburn Kurtz Mackiewicz & Norris LLP

[57] ABSTRACT

A motor vehicle electrical system having an engine-driven generator for supplying electrical loads on the vehicle, and a semiconductor switch connected in series with the field winding of the generator for on-off control of its excitation. The generator output voltage is constantly compared with a reference voltage in order to provide a duration modulated pulse signal. During steady-state operation, when the sensed generator voltage develops higher than the reference voltage during each prescribed period of time, the switch is biased on and off by the first duration modulated pulse signal. In the event of an abrupt rise in energy requirement from the loads, when the sensed generator voltage does not grow higher than the reference voltage within the preset time, a second duration modulated pulse signal is applied to the switch in order to make progressively longer the excitation periods of the generator field winding. The second duration modulated pulse signal is created mainly by a digital integrated circuit comprising two down counters.

10 Claims, 18 Drawing Sheets

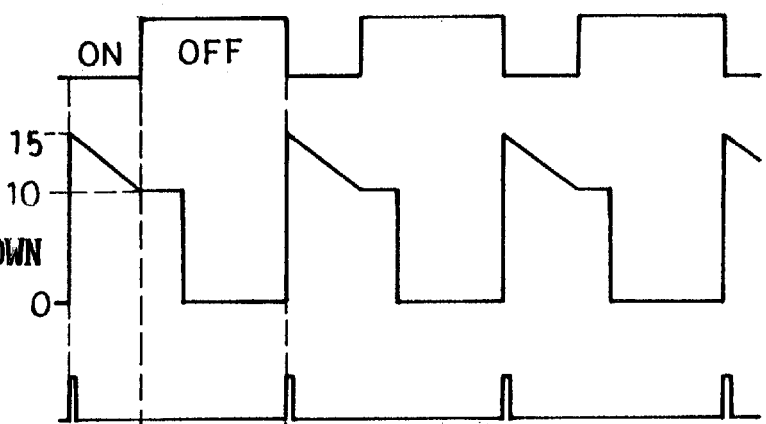
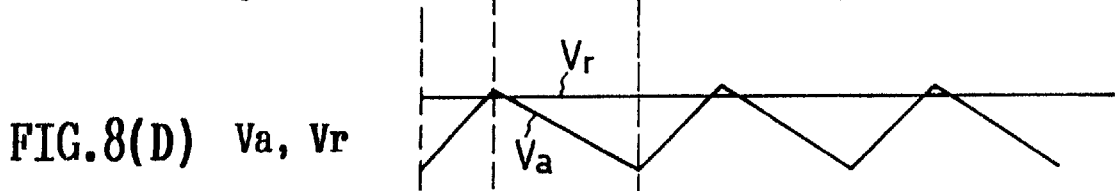
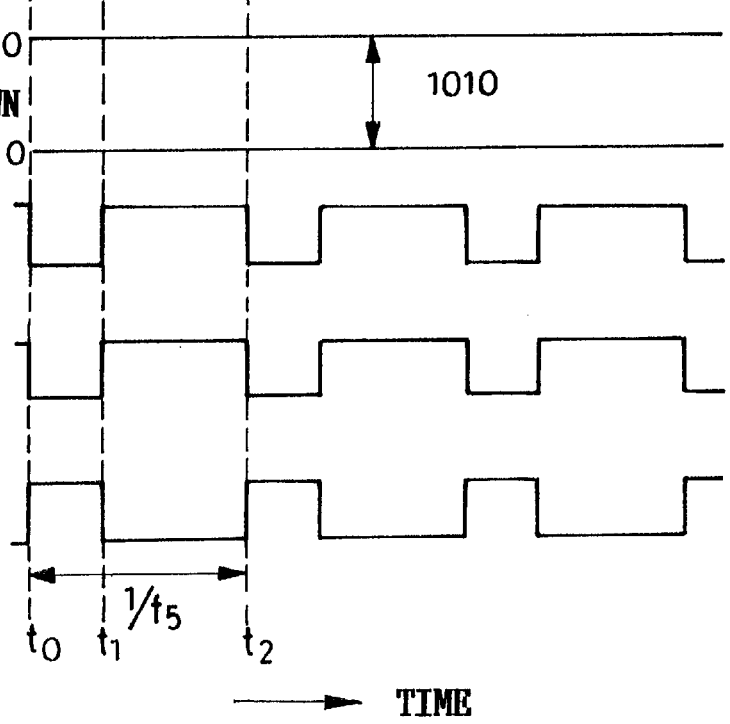

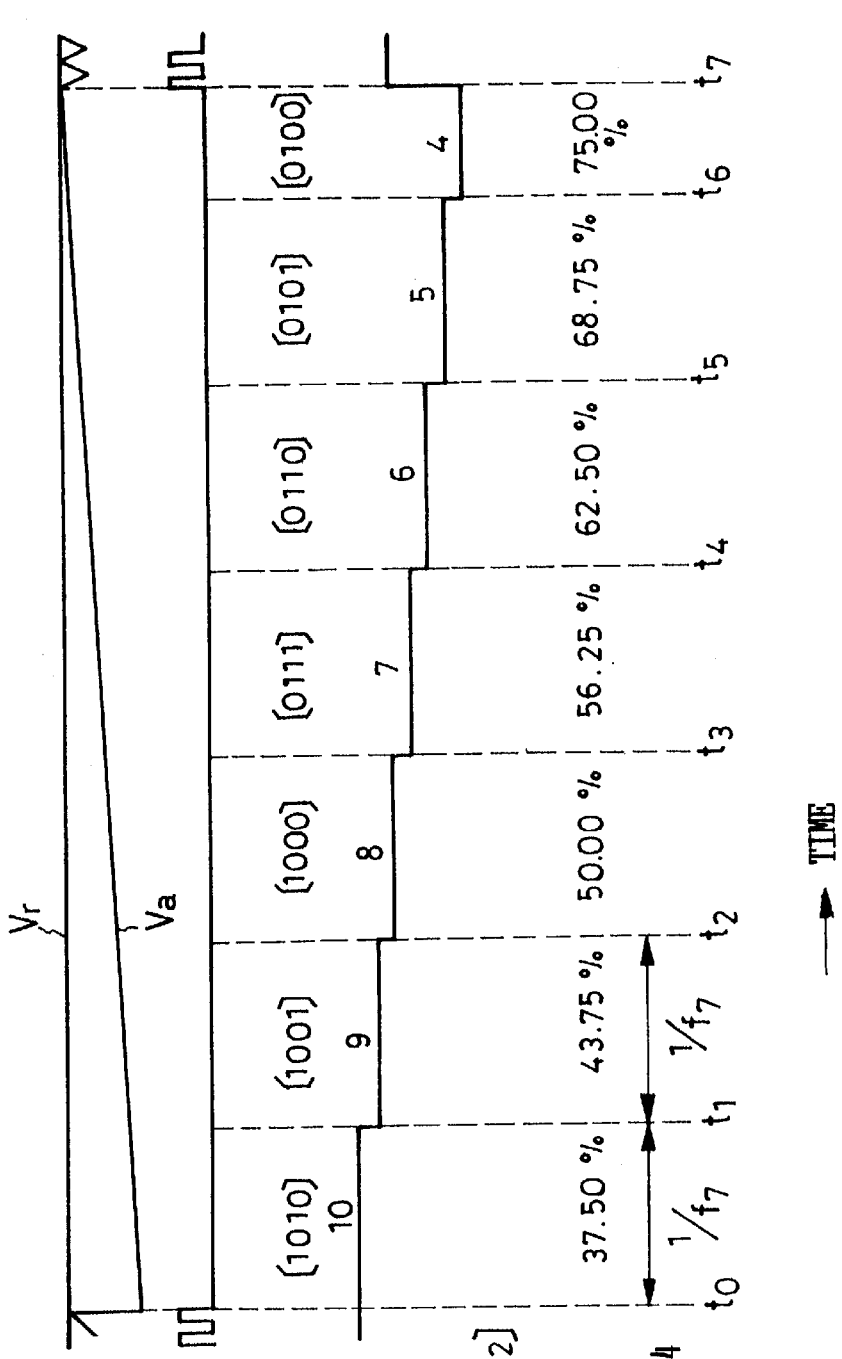

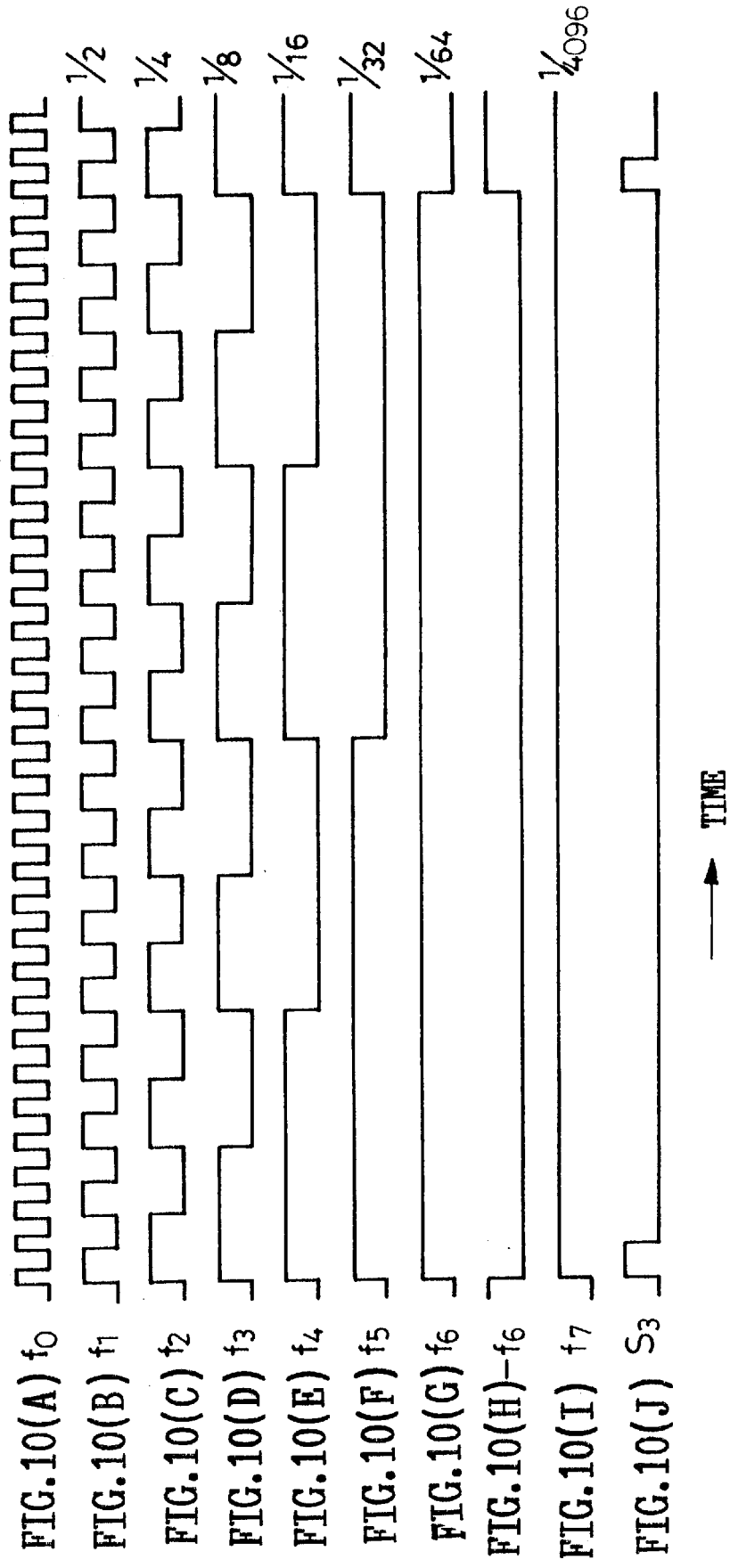

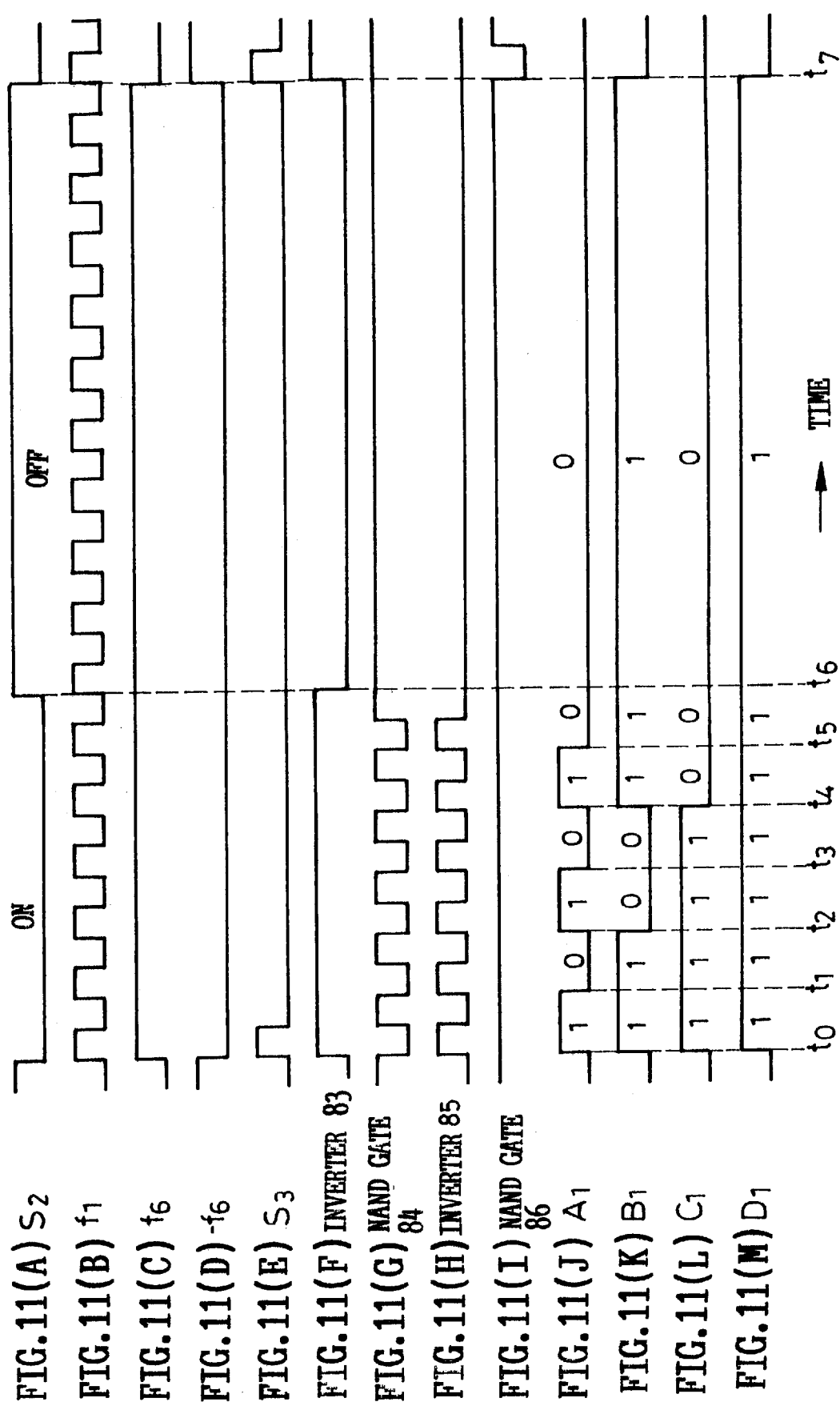

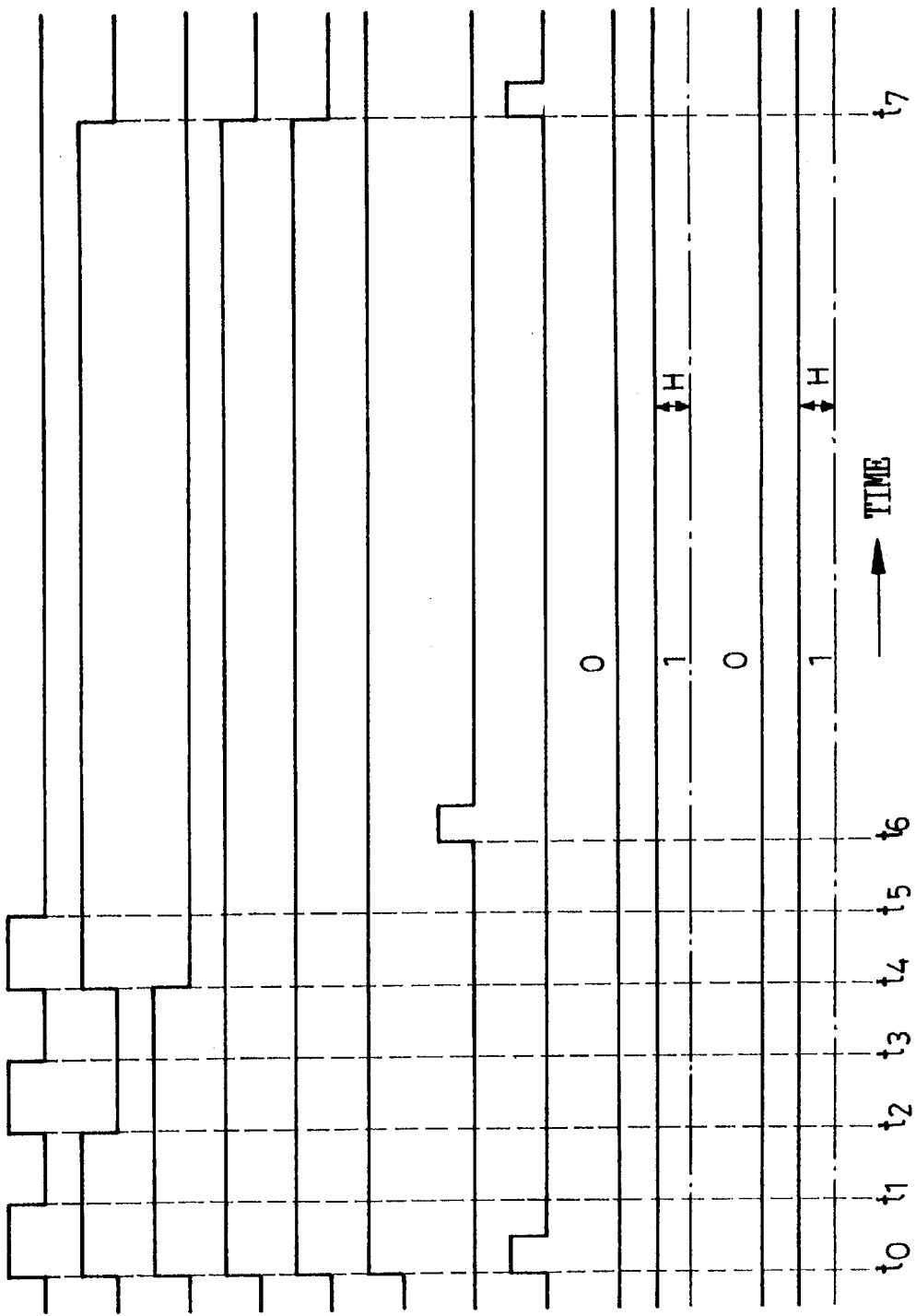

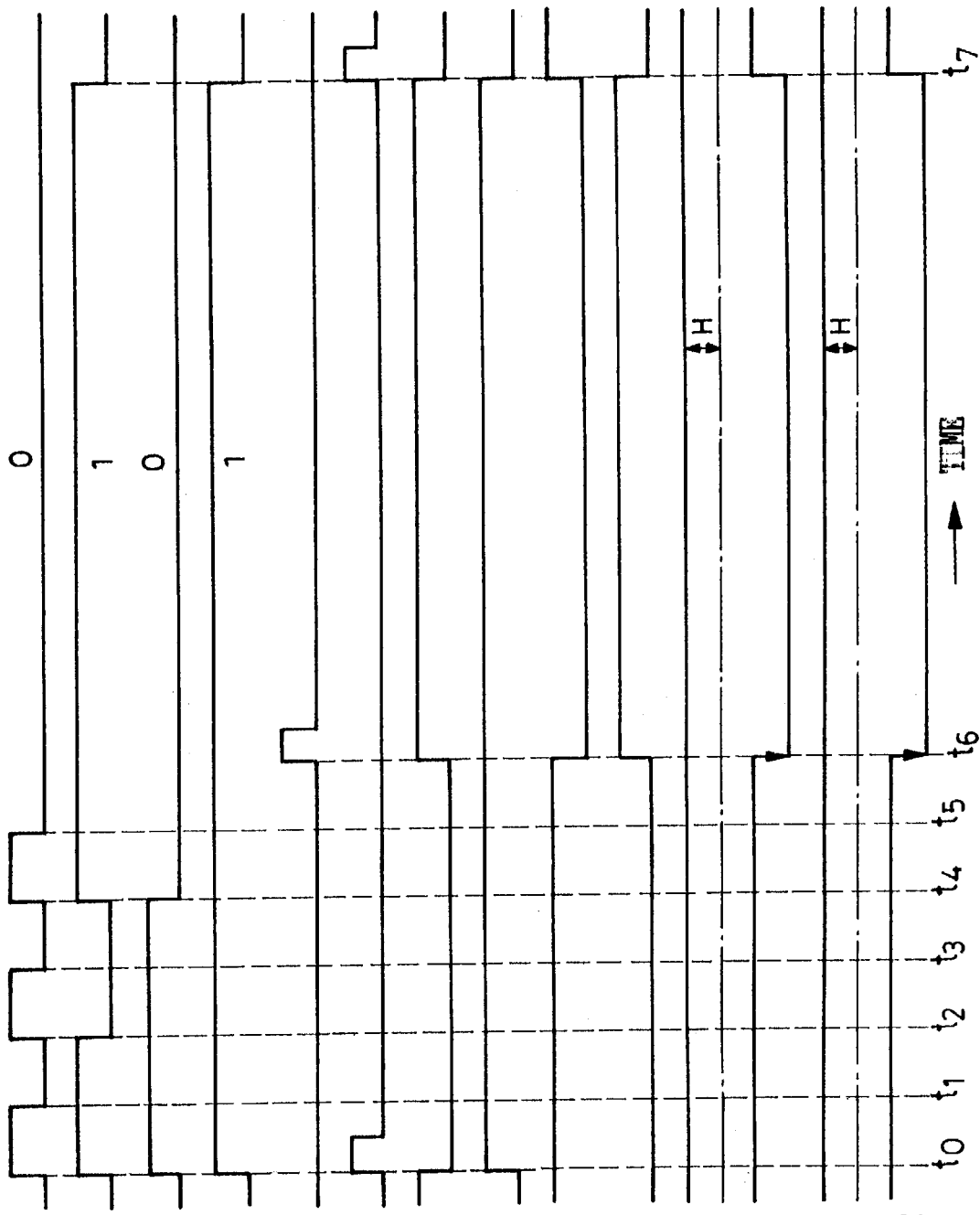

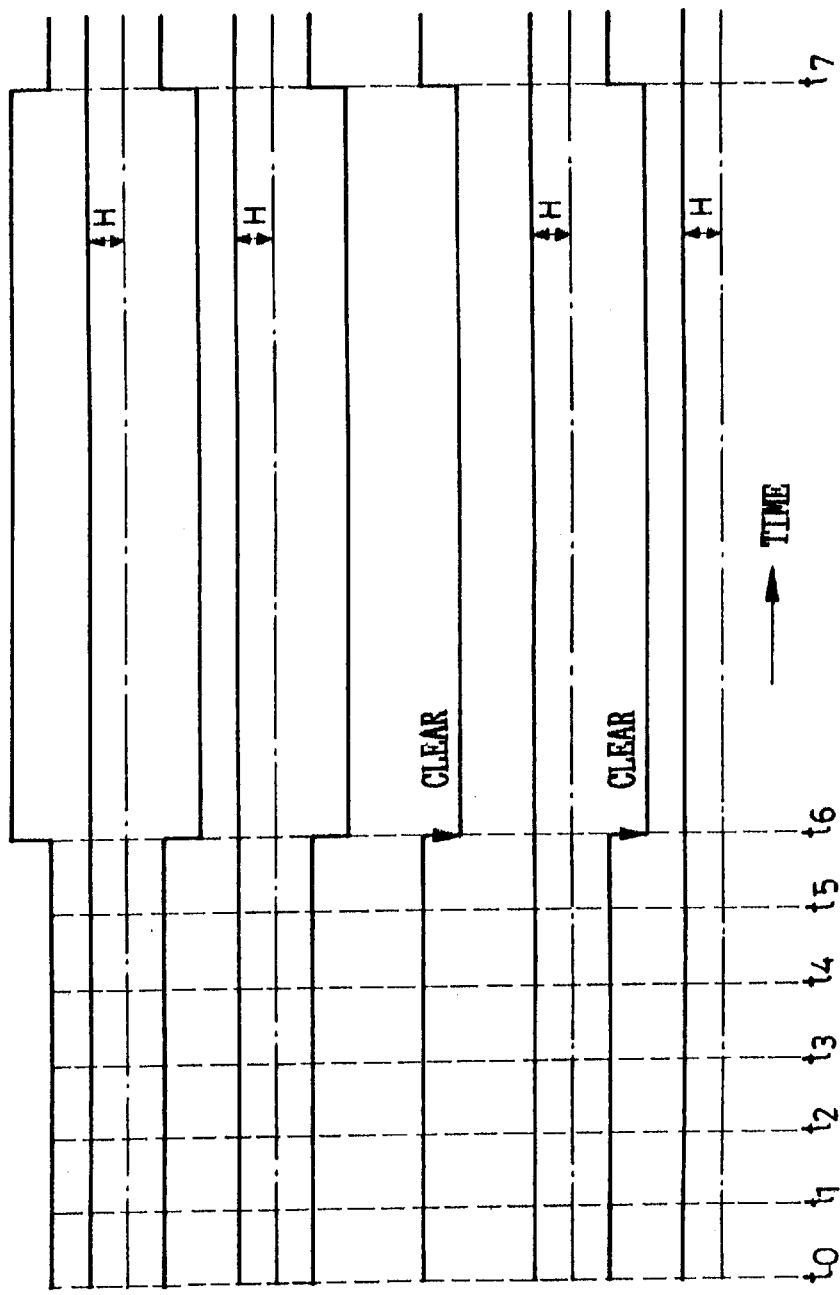

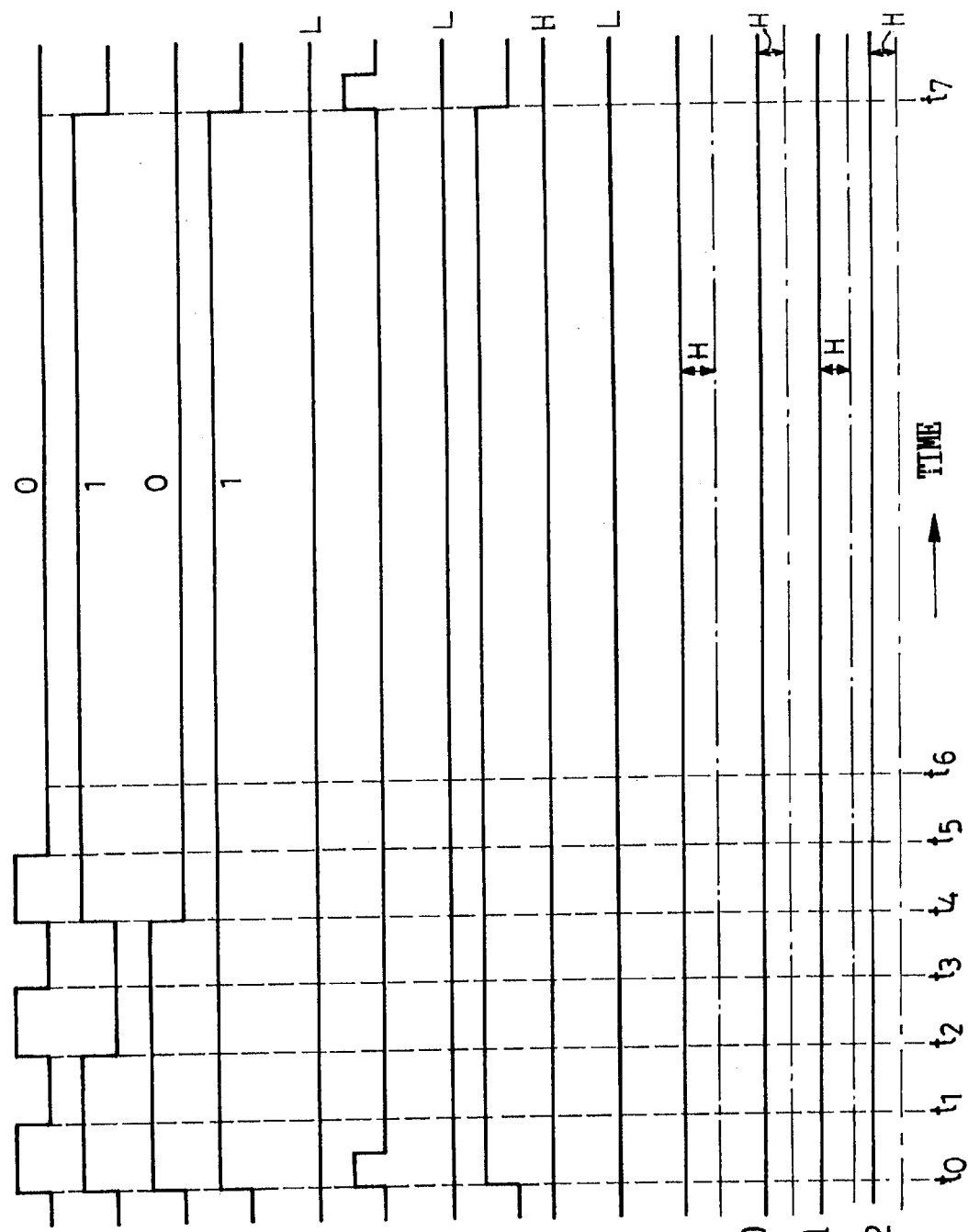

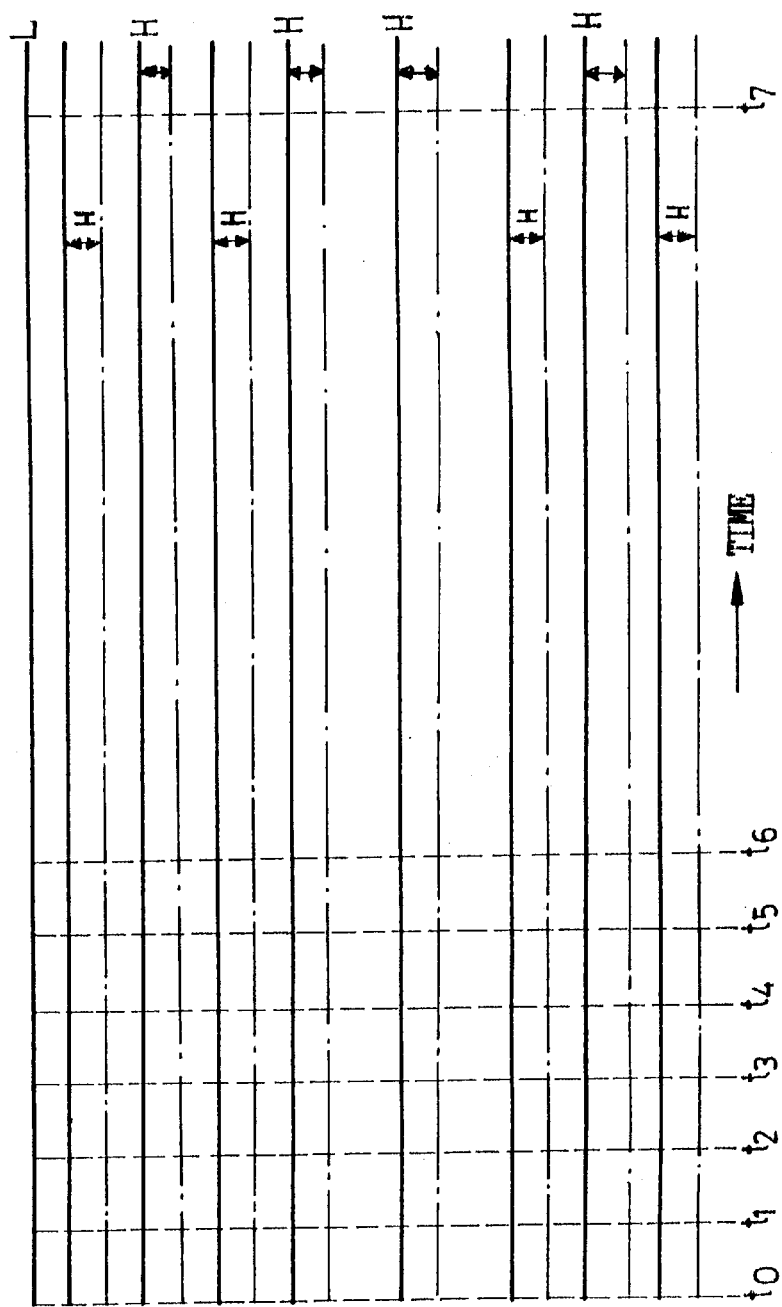

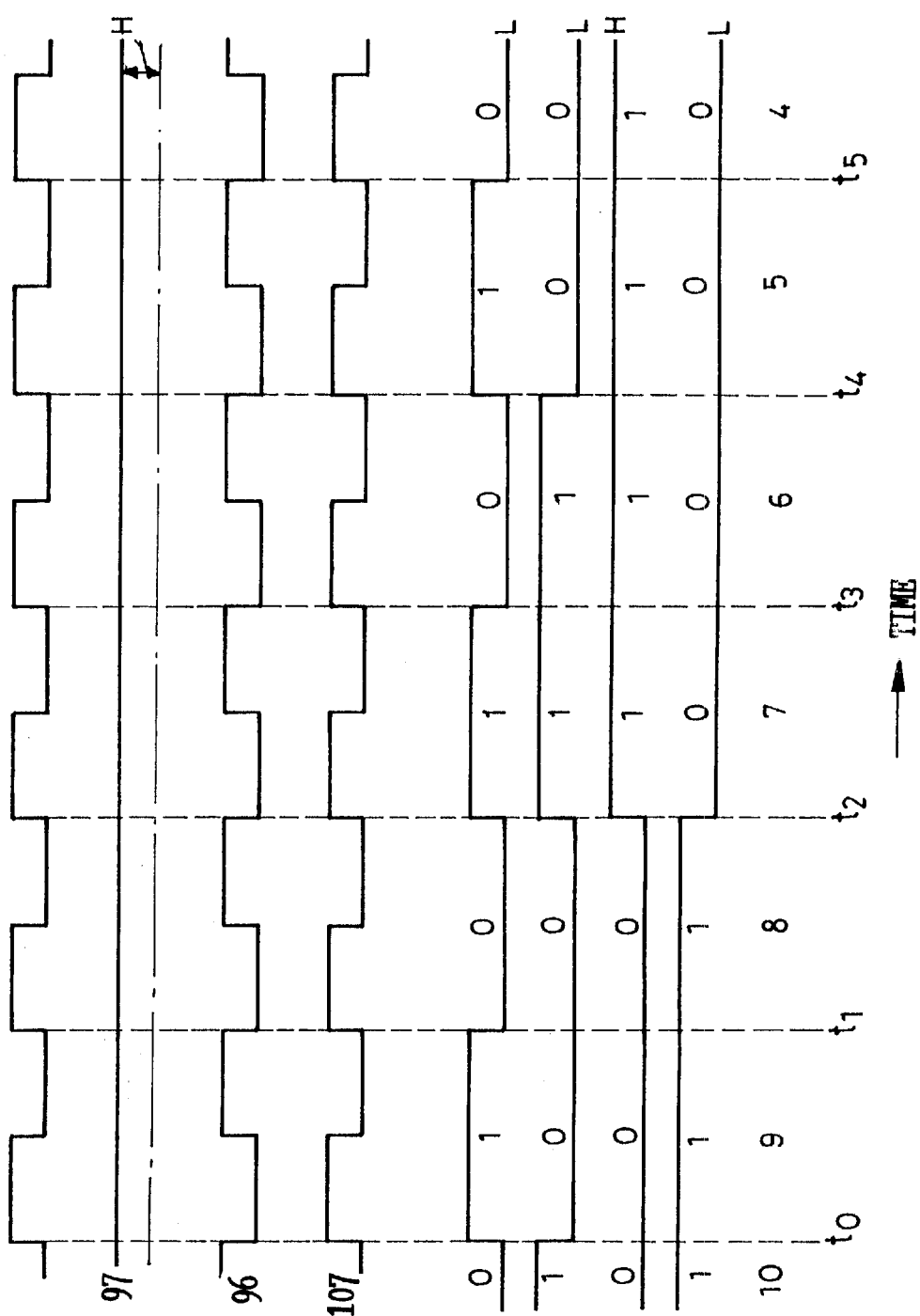

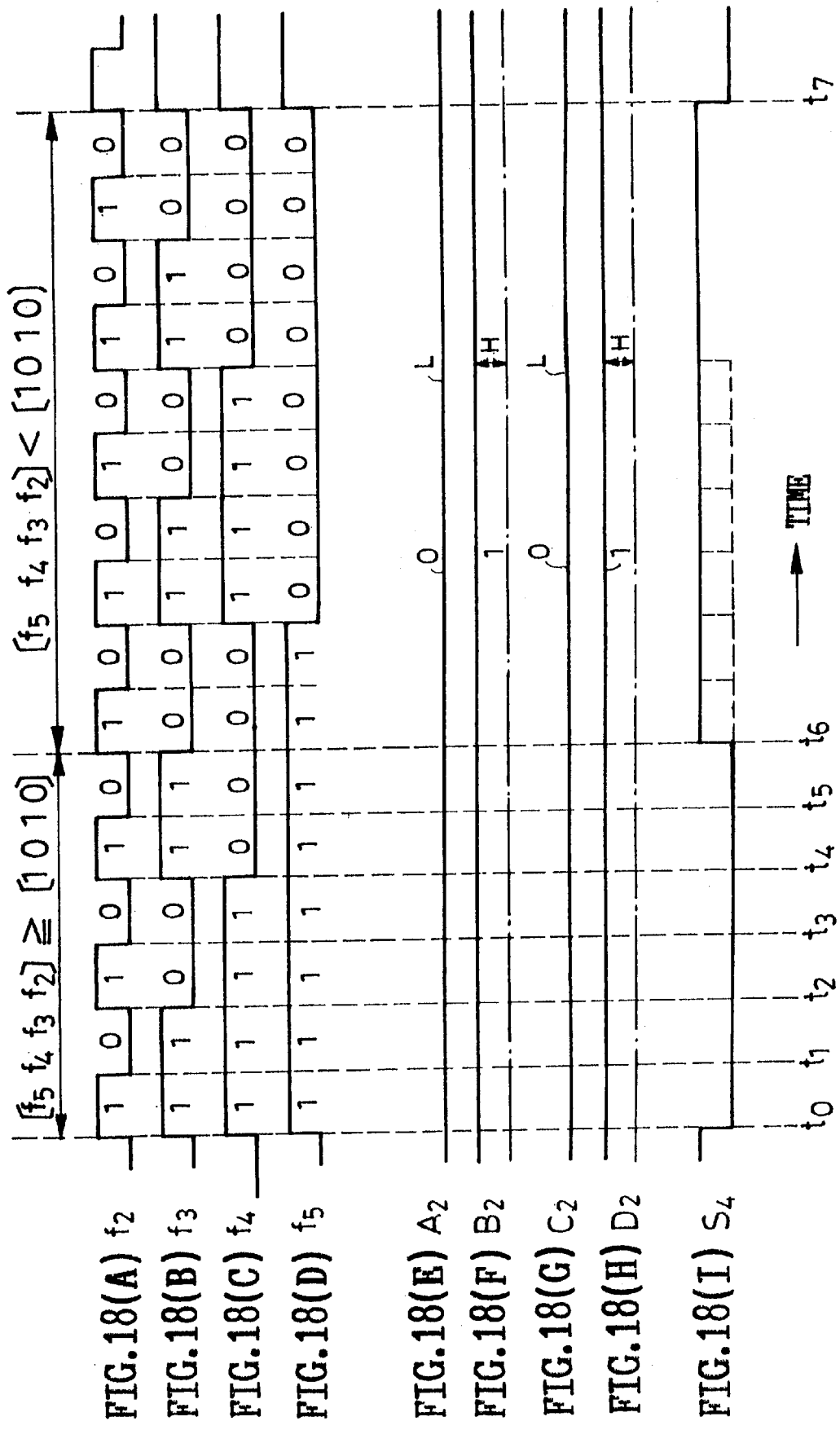

GENERATOR VOLTAGE REGULATING SYSTEM

BACKGROUND OF THE INVENTION

This invention relates generally to voltage regulators, and more specifically to one for regulating the output voltage of an alternating current generator used on a motor vehicle for supplying the electrical loads thereon.

Vehicular generator output voltage regulating systems have been known and used extensively which include a semiconductor switch such as a transistor. Connected in series with the field winding of the generator, the switch is repeatedly turned on and off at controlled time intervals, causing the generator field winding to be energized so as to hold the generator output voltage practically constant. The following two different methods have been suggested and used for on-off control of the switch.

One such known method, according to Japanese Unexamined Patent Publication No. 54-30416, teaches to detect the output voltage of the generator. The switch is opened when the generator output voltage is higher than a desired level, and closed when otherwise. The switch is repeatedly turned on and off in response to sensed voltage changes so as to hold the generator output voltage at the desired value. This known method offers the advantage of simplicity in circuitry. Offsetting this advantage, however, is a serious drawback that arises in the event of a rapid drop in the generator output voltage due to an abrupt rise in energy requirement from a load or loads. Thereupon the generator is caused to demand such a high driving torque from the vehicle engine that it can noticeably slow down, hampering the smooth or safe driving of the vehicle.

Bowman et al. U.S. Pat. No. 4,636,706 represents the second known method which employs an up-down counter responsive to the relative magnitudes of the actual output voltage of the generator and the desired regulated output voltage of the generator. The counter is driven in an increasing direction when the actual generator voltage is below the desired regulated value, and in a decreasing direction when the actual generator voltage is above the desired regulated value. The instantaneous count of the counter determines the time during which the semiconductor switch is closed, and hence the pulse duration of the voltage applied to the generator field. The on time of the switch is shortened when the actual generator voltage is above the desired value, and extended when the actual generator voltage is below the desired value.

The Bowman et al. method overcomes the drawback of the first described method of generator voltage regulation. The bidirectional counter in use permits fine adjustment of the rate at which it is incremented and decremented, in order to correspondingly vary the rate at which the pulse durations of the voltage applied to the generator field are changed. No inconveniently abrupt change in the torque requirement of the generator is therefore to occur. This second known method has its own shortcoming, however. It requires highly complex, expensive circuitry for control of the bidirectional counter which must perform the dual purpose of extending and shortening the pulse durations of the voltage applied to the generator field winding.

SUMMARY OF THE INVENTION

The present invention seeks to cause the generator to regain its normal output voltage without excessive driving torque requirement in the event of a large drop in the output voltage of the generator.

The invention also seeks to attain the first recited objective by an improved generator voltage regulating system of simpler and less expensive circuit configuration than heretofore.

Briefly, the invention may be summarized as system for regulating the output voltage of a generator, comprising: a switch to be connected in series with the field winding of the generator for on-off control of excitation thereof; a comparator for comparing a sensed output voltage of the generator with a reference voltage; first pulse generating means connected to the comparator for producing a first duration modulated pulse signal which gains a first state in response to reset pulses, and a second state when the sensed generator voltage is higher than the reference voltage, the first duration modulated pulse signal being produced only as long as the sensed generator voltage grows higher than the reference voltage during each cycle of the reset pulses; counter means for ascertaining the length of each switch-on period during which the switch is on; switch-on period determination means connected to the comparator and the counter means for providing an output that represents the ascertained length of the latest switch-on period when the sensed generator voltage grows higher than the reference voltage during each cycle of the reset pulses, and that represents a series of predetermined incremental switch-on periods when the sensed generator voltage does not grow higher than the reference voltage during each cycle of the reset pulses; second pulse generating means for producing a second duration modulated pulse signal indicative of the switch-on periods represented by the output from the switch-on period determination means; and switch control means connected to the first and the second pulse generating means for on-off control of the switch by the first duration modulated pulse signal when the sensed generator voltage grows higher than the reference voltage during each cycle of the reset pulses, and by the second duration modulated pulse signal when the sensed generator voltage does not grow higher than the reference voltage during each cycle of the reset pulses.

In short the present invention proposes to make switching control of generator field excitation by the first or the second duration modulated pulse signal depending upon whether the vehicle electrical system is in steady state or not. The first duration modulated pulse signal is used during steady-state system operation when there is no excessive or abrupt rise, but there may be a drop, in power requirement from the vehicle electrical loads. Only upon suddenly large increase in power requirement is the second duration modulated pulse signal used, so that the second signal is required only to increment the successive periods during which the switch is to be closed. Much simpler circuit means are therefore required than those for the prior art method of controlling the switch-on periods in both directions; for example, the invention requires down counters where the prior art employs up-down counters.

The above and other objects, features and advantages of this invention and the manner of realizing them will become more apparent, and the invention itself will best be understood, from a study of the following description and appended claims, with reference had to the attached drawings.

BRIEF DESCRIPTION OF THE DRAWINGS

FIG. 8 consisting of (A) through (I), is a diagram of waveforms appearing in various parts of the FIG. 2 voltage regulator when the FIG. 1 system is in steady-state operation;

FIG. 9 consisting of (A) through (D), is a diagram of waveforms appearing in various parts of the FIG. 2 voltage regulator in the event of a sharp rise in energy requirement from the vehicle loads in the FIG. 1 system;

FIG. 10 consisting of (A) through (J), is a diagram of waveforms appearing in various parts of the FIG. 3 digital integrated circuit, the diagram showing in particular clock pulses and reset pulses used in the voltage regulator of the FIG. 1 system;

FIG. 11 consisting of (A) through (M), is a diagram of waveforms appearing in various parts of the FIG. 5 first down counter of the FIG. 2 digital integrated circuit;

FIG. 12 consisting of (A) through (L), is a diagram of the input and output signals of the FIG. 6 second down counter of the FIG. 2 digital integrated circuit;

FIG. 13 consisting of (A) through (N), is a diagram of waveforms explanatory of how there are formed the preset signals of the flip flops of the FIG. 6 second down counter of the FIG. 2 digital integrated circuit when the FIG. 1 system is in steady-state operation;

FIG. 14 consisting of (A) through (I), is a diagram of waveforms explanatory of how there are formed the clear signals of the flip flips of the FIG. 6 second down counter when the FIG. 1 system is in steady-state operation;

FIG. 15 consisting of (A) through (N), is similar to FIG. 13 except that the waveforms depicted are those in the event of an abrupt rise in energy requirement from the loads;

FIG. 16 consisting of (A) through (I), is similar to FIG. 14 except that the waveforms depicted are those in the event of an abrupt rise in energy requirement from the loads;

FIG. 17 consisting of (A) through (I), is a diagram of waveforms appearing in various parts of the FIG. 6 second down counter of the FIG. 2 digital integrated circuit in the event of an abrupt rise in energy requirement from the loads; and FIG. 18 consisting of (A) through (I), is a diagram of the input and output signals of the FIG. 7 duration modulated pulse generator of the FIG. 2 digital integrated circuit.

DESCRIPTION OF THE PREFERRED EMBODIMENT

Figure 1:
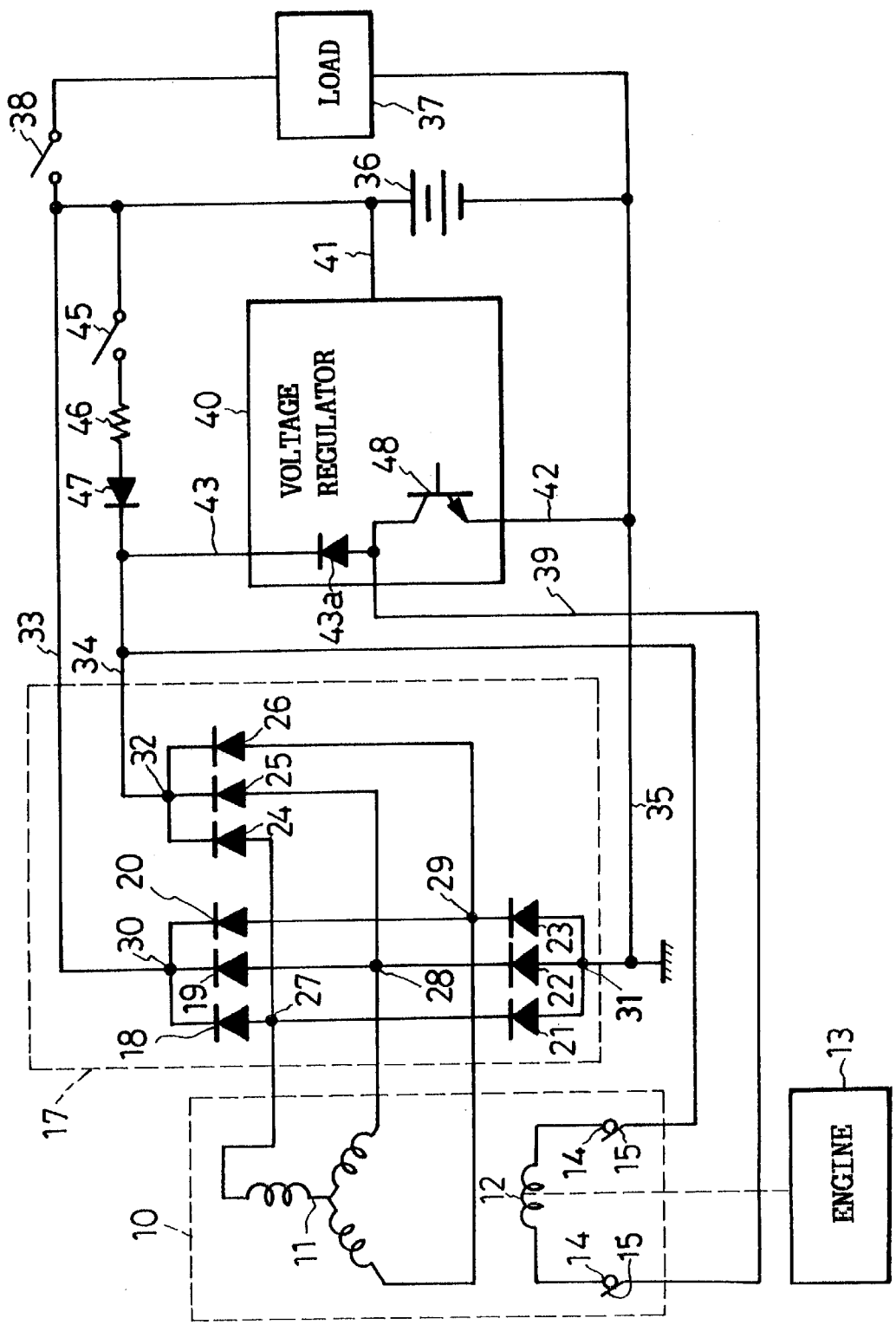
FIG. 1 is a schematic electrical diagram of a motor vehicle electrical system embodying the principles of the present invention.

The voltage regulating system according to the present invention is currently believed to be best applicable to alternating current generators on motor vehicles. In FIG. 1, therefore, there is shown a system of vehicular electricals including an alternating current generator 10. The generator 10 is shown to comprise a star network of three-phase stator windings 11 and a field winding 12. The stator windings could be in delta connection, however. It is understood that the field winding 12 is carried by the rotor, not shown, of the generator 10 which is driven by a vehicle engine 13 of any known or suitable type or design. A pair of slip rings 14 and a pair of brushes 15 are therefore shown provided for energizing the rotary field winding 12.

The reference numeral 17 generally denotes a three phase rectifier circuit for translating the output from the alternating current generator 10 into a unidirectional voltage. The rectifier 17 is shown to comprise nine diodes 18–26 which may be thought of as being electrically divided into three groups, each consisting of three diodes. The first group of diodes 18–20 are connected respectively between three a.c. inputs 27–29 and a first d.c. output 30, the a.c. inputs being connected respectively to the three output conductors of the three-phase stator windings 11. The second group of diodes 21–23 are connected between the a.c. inputs 27–29 and a grounded output 31, and the third group of diodes 24–26 between the a.c. inputs 27–29 and a second d.c. output 32. The first and the second d.c. outputs 30 and 32 are connected respectively to first and second d.c. output conductors 33 and 34, and the grounded output 31 to a grounded output conductor 35.

Thus, in the illustrated representative rectifier circuit, the diodes 18–23 constitute a three-phase, full-wave bridge rectifier, and the diodes 21–26 constitute another such circuit. Both full-wave rectifiers make common use of the second group of grounded or negative diodes 21–23. Alternatively, however, the second group of diodes 21–23 could be connected only to the first group of diodes 18–20, and another similar group of negative diodes could be provided for connection solely to the third group of diodes 24–26. It is also possible to dispense with the third group of diodes 24–26 and, instead, to connect the second d.c. output conductor 34 to the first d.c. output 30.

A storage battery 36 is connected between the first d.c. output conductor 33 and grounded output conductor 35 of the rectifier 17. The electrical load or loads 37 of the motor vehicle are connected in parallel with the battery 37 via an on-off switch 38.

The field winding 12 of the generator 10 has one of its extremities connected to the second d.c. output 32 of the rectifier 17 via one slip ring 14 and one brush 15. The other extremity of the field winding 12 is connected, via the other slip ring 14 and the other brush 15, to a conductor 39 leading to a voltage regulator 40 forming the gist of this invention.

The voltage regulator 40 regulates the current of the generator field winding 12 according to the voltage across the battery 36. To this end the voltage regulator 40 has a voltage sensing conductor 41 connected to the positive terminal of the battery 36, another conductor 42 shown connected to the grounded conductor 35, and still another conductor 43 shown connected to the second d.c. output conductor 34 of the rectifier circuit 17 for creating a closed circuit including the generator field winding 12.

The voltage regulator 40 is shown in FIG. 1 as comprising a transistor 48 connected in series with the generator field winding 12, and a diode 43a connected in parallel with the generator field winding. This showing is purely for lack of space in the figure; actually, the voltage regulator is configured as diagrammed in FIG. 2, to which reference will be had shortly.

FIG. 1 additionally illustrates a serial connection of a key switch 45, current limiting resistor 46 and reverse blocking diode 47, through which serial circuit the storage battery 36 is connected to one extremity of the generator field winding 12 for supplying a start current thereto. It is understood that the key switch 45 is also connected to the starter motor, not shown, of the engine 13.

Figure 2:
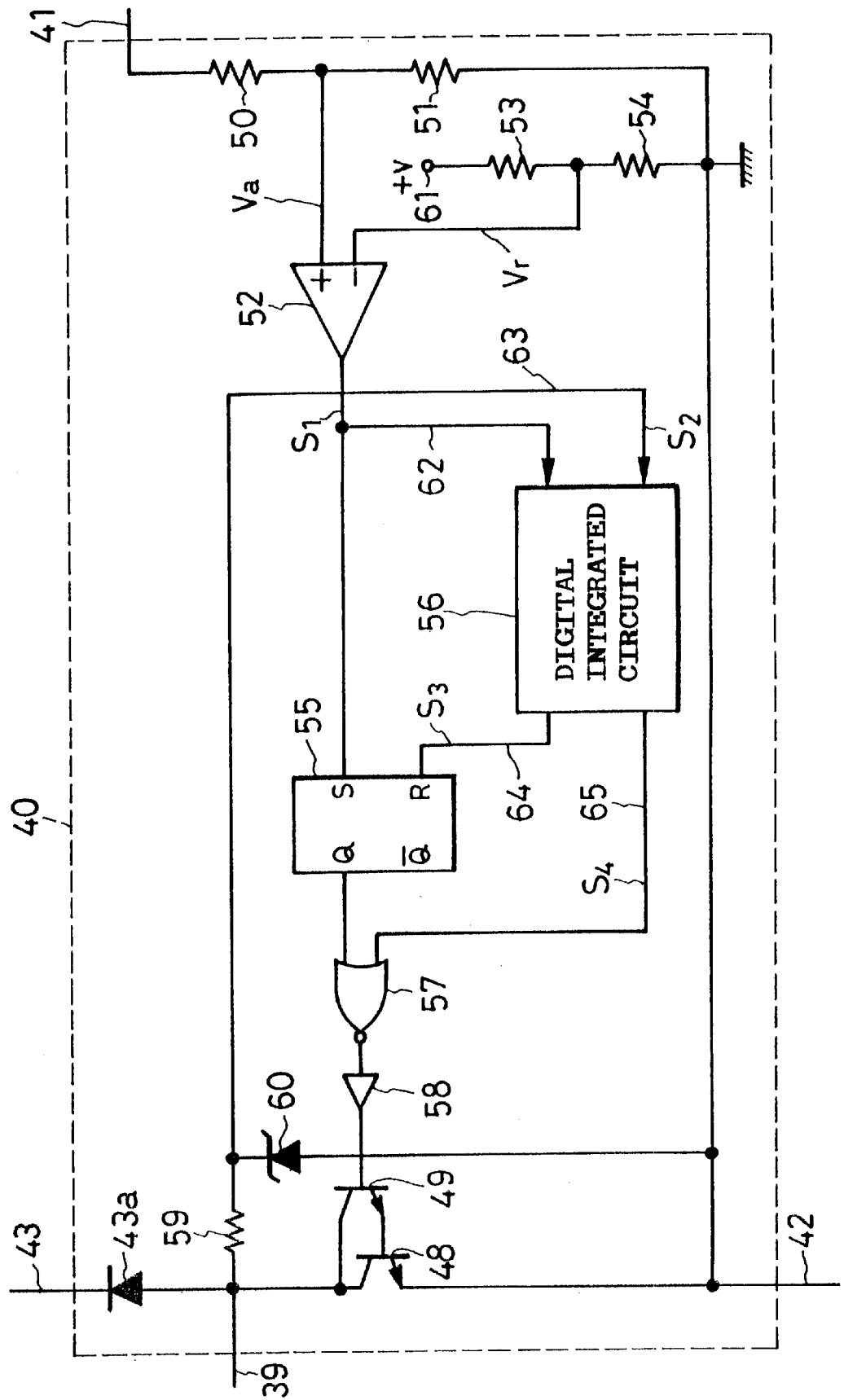
FIG. 2 is a schematic electrical diagram showing in more detail the voltage regulator included in the FIG. 1 system.

Reference is now directed to FIG. 2 for a more detailed study of the voltage regulator 40. The noted transistor 48 of the voltage regulator 40 is Darlington connected with another npn transistor 49 to make up a semiconductor switch for excitation control of the generator field winding 12. The transistor 48 has its collector connected by way of the conductor 39 to one extremity of the generator field winding 12, and its emitter grounded by way of the conductors 42 and 35, FIG. 1. Thus, with the conduction and nonconduction of the transistor 48, the current flow from rectifier 17 to generator field winding 12 will be switched on and off.

The voltage regulator 40 includes various other elements for controlling the duty ratio of the switching transistor 48 according to the voltage of the battery 36, or the d.c. output voltage of the rectifier 17. Such circuit elements include two resistors 50 and 51 for sensing the output voltage of the generator 10, a voltage comparator 52, two other resistors 53 and 54 for providing a reference voltage, an RS flip flop 55, a digital integrated circuit 56, a NOR gate 57, a buffer amplifier 58, still another resistor 59, and a Zener diode 60.

The generator voltage sensing resistor 50 has one of its extremities connected by way of the conductor 41 to the positive terminal of the battery 36, FIG. 1, and to the first d.c. output conductor 33 of the rectifier 17. The other extremity of this resistor 50 is grounded via the resistor 51.

The comparator 52 has one input connected to the junction between the voltage dividing resistors 50 and 51 for inputting a voltage Va that is a function of the magnitude of the generator output voltage. The voltage Va will be hereinafter referred to as the sensed generator voltage. The other input of the comparator 52 is connected to the junction between the reference voltage resistors 53 and 54. Connected in series between a positive voltage supply terminal 61 and the motor vehicle ground, the resistors 53 and 54 function to divide the constant supply voltage +V, providing a reference voltage Vr for application to the comparator 52. This comparator therefore compares the sensed generator voltage Va and the reference voltage Vr, producing a binary output signal $S_1$ which is high when Va is higher than Vr, and low when Va is lower than Vr.

The digital integrated circuit 56 is connected to the output of the comparator 52 by way of a first input conductor 62, to the collector of the switching transistor 48 by way of a second input conductor 63 bearing the resistor 59, to the reset input R of the flip flop 55 by way of a first output conductor 64, and to one of the two inputs of the NOR gate 57 by way of the second output conductor 65. The digital integrated circuit 56 performs the dual function of supplying a series of reset pulses $S_3$ to the flip flop 55 and a series of duration modulated pulses $S_4$ to the NOR gate 57. The digital integrated circuit 56 is shown in detail in FIG. 3, to which reference will be had later on.

The flip flop 55 has a set input S connected directly to the output of the comparator 52, and a Q output connected to the second input of the NOR gate 57. This NOR gate has its output connected to the base of the switching transistor 49 via the buffer amplifier 58 and thence to the other switching transistor 48.

In order to provide a switch state signal $S_2$, indicative of whether the switching transistor 48 is on or off, for application to the digital integrated circuit 56 over the second input conductor 63 thereof, the Zener diode 60 is connected in parallel with that transistor via the resistor 59. The voltage between the collector and emitter of the switching transistor 48 is low during its conduction, and high during its nonconduction. Consequently, the switch state signal $S_2$ is low when the switching transistor 48 is on, and high when it is off. The Zener diode 60 conducts, during the nonconduction of the switching transistor 48, making constant the high state of the switch state signal $S_2$.

Connected between conductors 39 and 43, the diode 43a functions to release, during the nonconducting periods of the switching transistor 48, the energy that has been stored in the field winding 12 during the conducting period of that transistor. Thus an electric current flows through the field winding 12 even during the nonconduction of the switching transistor 48.

It is considered more conducive to a better understanding of the invention to briefly outline the operation of the voltage regulator 40 of the FIG. 2 construction now, before proceeding to a detailed inspection of the digital integrated circuit 56 included therein.

Diagramed in FIG. 8 are the waveforms appearing in various parts of the voltage regulator 40 during the normal or steady-state operation of this engine driven generator voltage regulating system. Normally, or in the absence of an abrupt rise in energy requirement from the electrical loads, the NOR gate 57 will go high, as at (I) in FIG. 8, in response to a reset pulse $S_3$, FIG. 8(C), at time $t_o$. Then, at time $t_1$, the NOR gate 57 will go low in response to an output pulse $S_1$, FIG. 8(E), from the comparator 52. The switching transistor 48 is therefore on during the $t_o$–$t_1$ period in FIG. 8, completing a closed circuit comprised of the field winding 12, rectifier 17, and transistor 48. The field winding 12 is excited during this period.

Since the field winding 12 is inductive, the excitation current will gradually rise in magnitude during the conducting period of the switching transistor 48, and so will the output voltage of the generator 10 and of the rectifier 17. As depicted at (D) in FIG. 8, therefore, the sensed generator voltage Va will also rise correspondingly during the $t_o$–$t_1$ period. The output $S_1$ from the comparator 52 will go high at $t_1$, as at (E) in FIG. 8, when Va exceeds the reference voltage Vr. This high output from the comparator 52 will cause the flip flop 55 to be set, making its Q output go high at $t_1$, as at (G) in FIG. 8.

Set by the FIG. 8(E) output pulses $S_1$ of the comparator 52 and reset by the FIG. 8(C) output pulses $S_3$ of the digital integrated circuit 56, the flip flop 55 will put out a duration modulated pulse signal shown at (G) in FIG. 8. This duration modulated pulse signal is subsequently inverted by the NOR gate 57 into the form seen at (I) in FIG. 8, preparatory to application to the base of the transistor 49 via the buffer amplifier 58. Thus the switching transistors 48 and 49 will conduct when the NOR gate 57 is high, as from $t_o$ to $t_1$ in FIG. 8. The repeated switching of the transistors 48 and 49 will result in intermittent excitation of the field winding 12, causing change, if necessary, in the mean value of the field current.

Figure 4:
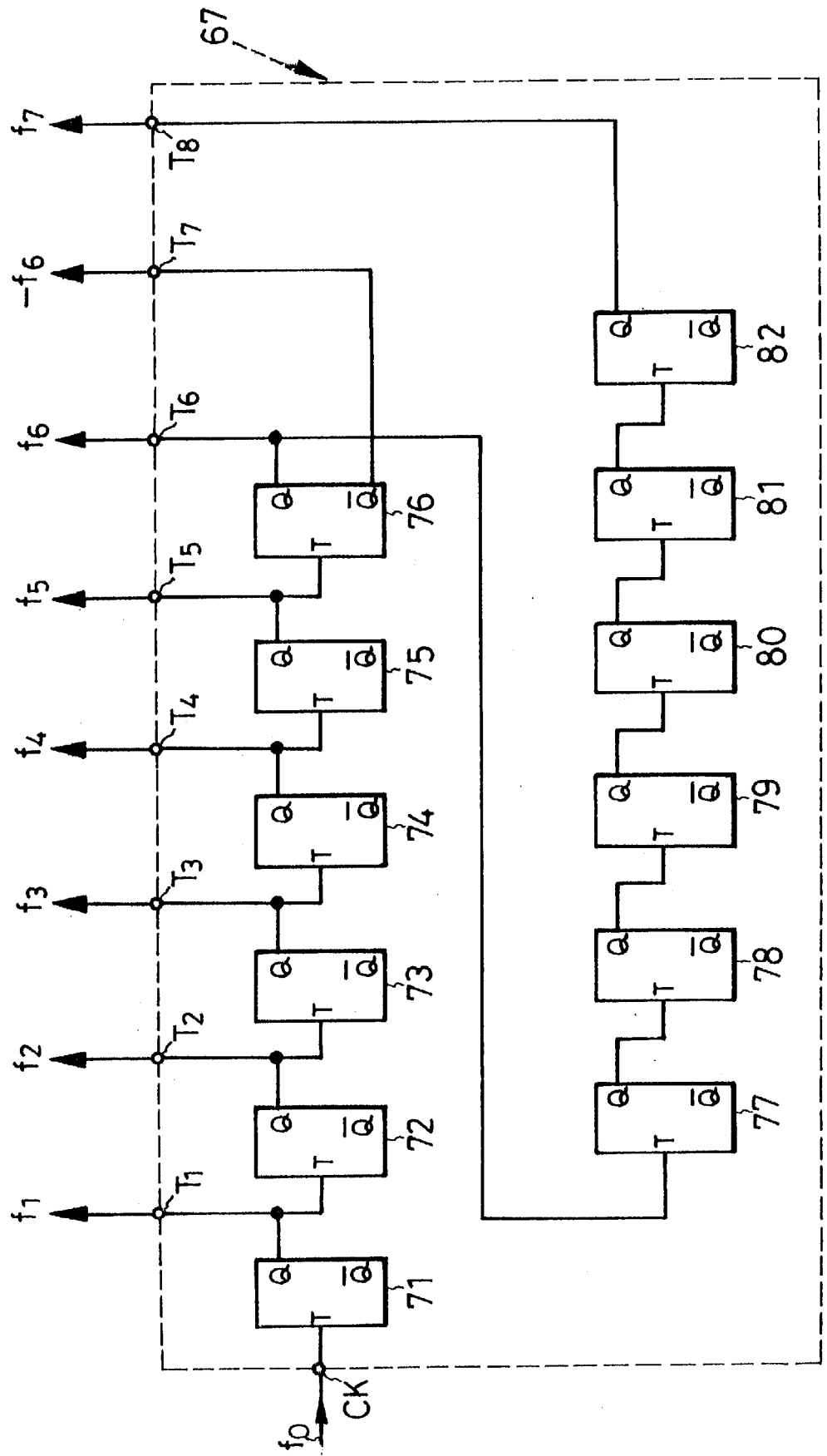
FIG. 4 is a block diagram showing in more detail the frequency divider included in the FIG. 3 digital integrated circuit.

During the steady-state operation of the generator voltage regulating system, as has been assumed above, a second duration modulated pulse signal $S_4$ will appear on the second output conductor 65 of the digital integrated circuit 56, as at (H) in FIG. 4, as a synchronous replica of the FIG. 8(G) first duration modulated pulse signal from the flip flop 55. When the first duration modulated pulse signal is low, so is the second $S_4$. Consequently, the output from the NOR gate 57 is a simple inversion of the first duration modulated pulse signal; in other words, during the normal operation of the system, the second duration modulated pulse signal $S_4$ does not in any way interfere with the switching control of the transistors 48 and 49 by the first.

In the event of an abrupt rise in energy requirement by the loads 37, resulting in a rapid drop in the output voltage of the generator 10, the sensed generator voltage Va will stay lower than the reference voltage Vr for a prolonged period of time, as from $t_o$ to $t_7$ at (A) in FIG. 9. The comparator 52 will produce no output pulse during this period, so that the first duration modulated pulse signal from the flip flop 55 will remain low, itself making no on-off control of the transistors 48 and 49.

It is, instead, the second duration modulated pulse signal $S_4$ from the digital integrated circuit 56 that controls the switching transistors 48 and 49 upon rapid increase in power requirement by the loads. Such being the construction of the digital integrated circuit 56, as will be detailed shortly, that the duty ratio of the second duration modulated pulse signal $S_4$ changes stepwise during the $t_o$–$t_7$ period, as at (D) in FIG. 9, causing gradual, rather than rapid, increase in the magnitude of the current that flows through the field winding 12. There are therefore no sudden or excessive increase in torque requirement from generator 10 to engine 13 and, in consequence, no objectionable drop in engine rpm, assuring smooth travel of the vehicle.

At (A) in FIG. 9 is shown the sensed generator voltage Va rising back to the level of the reference voltage Vr at $t_7$. Thereupon the comparator 52 will resume production of pulses $S_1$ for setting the flip flop 55 and hence for causing the same to resume production of the first duration modulated pulse signal. The transistors 48 and 49 will be switched by this first duration modulated pulse signal after $t_7$.

Figure 3:
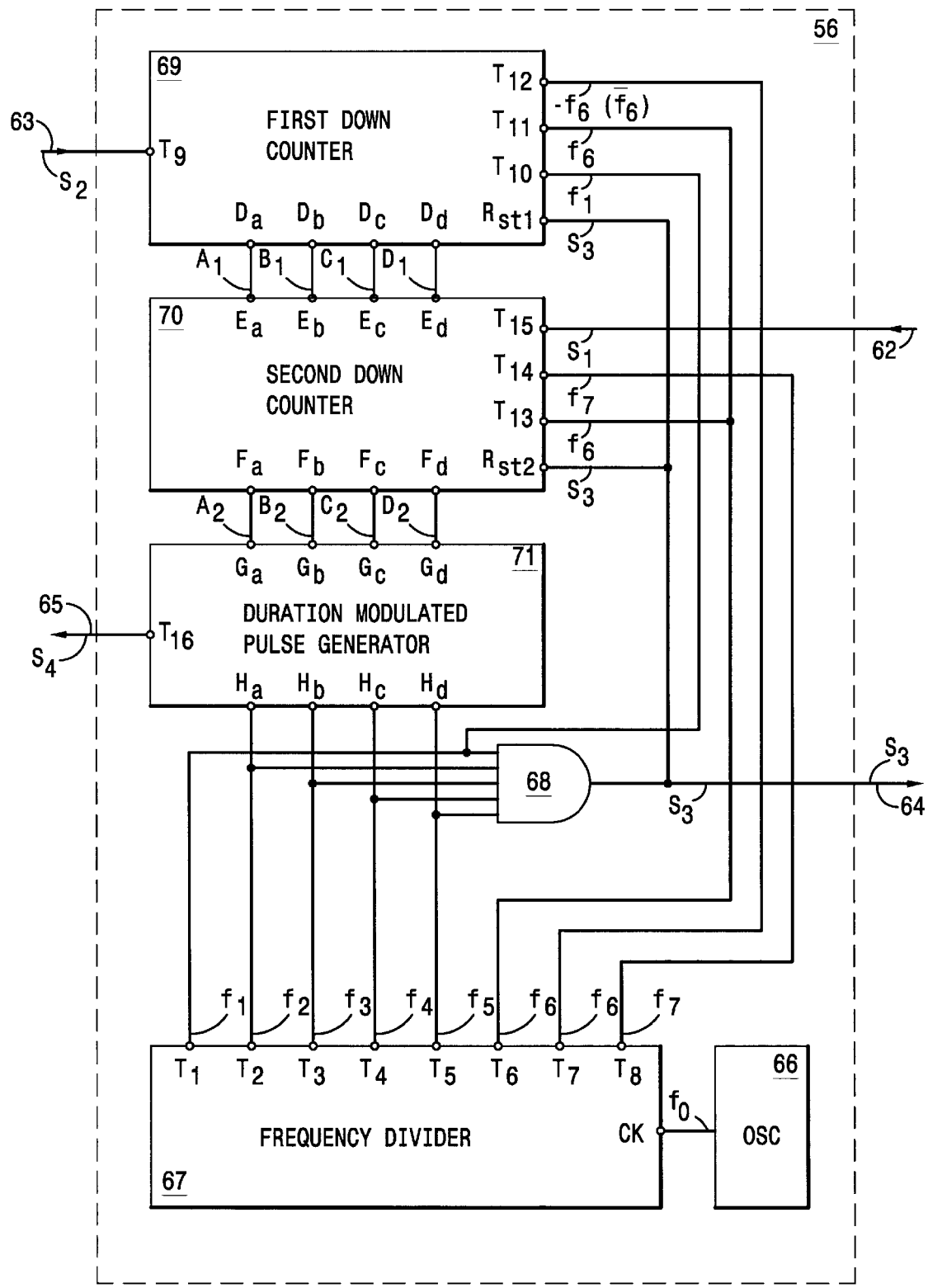
FIG. 3 is a block diagram showing in more detail the digital integrated circuit included in the FIG. 2 voltage regulator.

With reference now directed to FIG. 3 the digital integrated circuit 56 may be best envisaged as a combination of an oscillator 66, a frequency divider 67, an AND gate 68, a first 69 and a second 70 down counters, and a duration modulated pulse generator 71.

The oscillator 66 produces clock pulses $f_o$, FIG. 10(A), for delivery to the frequency divider 67. The frequency or repetition rate of the clock pulses $f_o$ is understood to be higher than the normal switching rate of the transistor 48. Inputting the clock signal $f_o$ through its input CK, the frequency divider 67 produces what may be termed subclock pulse signals $f_1$, $f_2$, $f_3$, $f_4$, $f_5$, $f_6$, $-f_6$, and $f_7$ from its outputs $T_1$, $T_2$, $T_3$, $T_4$, $T_5$, $T_6$, $T_7$ and $T_8$ at predetermined different fractions of the clock signal frequency. As indicated at (B)–(G) in FIG. 10, the frequencies of the subclock signals $f_1$–$f_6$ are ½, ¼, ⅛, 1/16, 1/32 and 1/64, respectively, of the clock signal frequency in this particular embodiment. The subclock signal $-f_6$, FIG. 10(H), is a simple phase inversion of the sixth subclock signal $f_6$. The subclock signal $f_7$, FIG. 10(I), has a much lower frequency of, say, 1/4096 the clock signal frequency.

As illustrated in more detail in FIG. 4, the frequency divider 67 is a cascade connection of twelve trigger flip flops 71–82, with the Q output of each flip flop connected to the trigger input T of that of the next stage. The first stage flip flop 71 has its trigger input T connected to the clock input CK of this frequency divider 67. The first to sixth stage flip flops 71–76 all have their outputs connected to the first to sixth frequency divider outputs $T_1$–$T_6$ for providing the subclock signals $f_1$–$f_6$. The sixth stage flip flop 76 additionally has its negative output connected to the seventh frequency divider output $T_7$ for providing the inversion $-f_6$ of the sixth subclock signal $f_6$. The twelfth stage flip flop 82 has its output connected to the eighth frequency divider output $T_8$ for providing the subclock signal $f_7$.

The first to fifth outputs $T_1$–$T_5$ of the frequency divider 67 are all connected to the five inputs of the AND gate 68, the output of which is connected to the reset input R of the flip flop 55, FIG. 2, to the reset input $Rst_1$ of the first down counter 69, FIG. 3, and to the reset input $Rst_2$ of the second down counter 70. The AND gate 68 produces a reset pulse $S_3$, FIG. 10(J), at the same frequency as the fifth subclock signal $f_5$, FIG. 10(F), or at 1/32 the frequency of the clock signal $f_o$, FIG. 10(A).

The first down counter 69 has an input $T_9$ connected to the collector of the switching transistor 48, FIG. 2, via the resistor 59, the noted reset input $Rst_1$, three subclock inputs $T_{10}$–$T_{12}$ connected respectively to the first, sixth and seventh outputs $T_1$, $T_6$ and $T_7$ of the frequency divider 67, and four count outputs Da, Db, Dc and Dd for producing a string of four binary digits representative of the instantaneous count of this first down counter 69.

Figure 5:
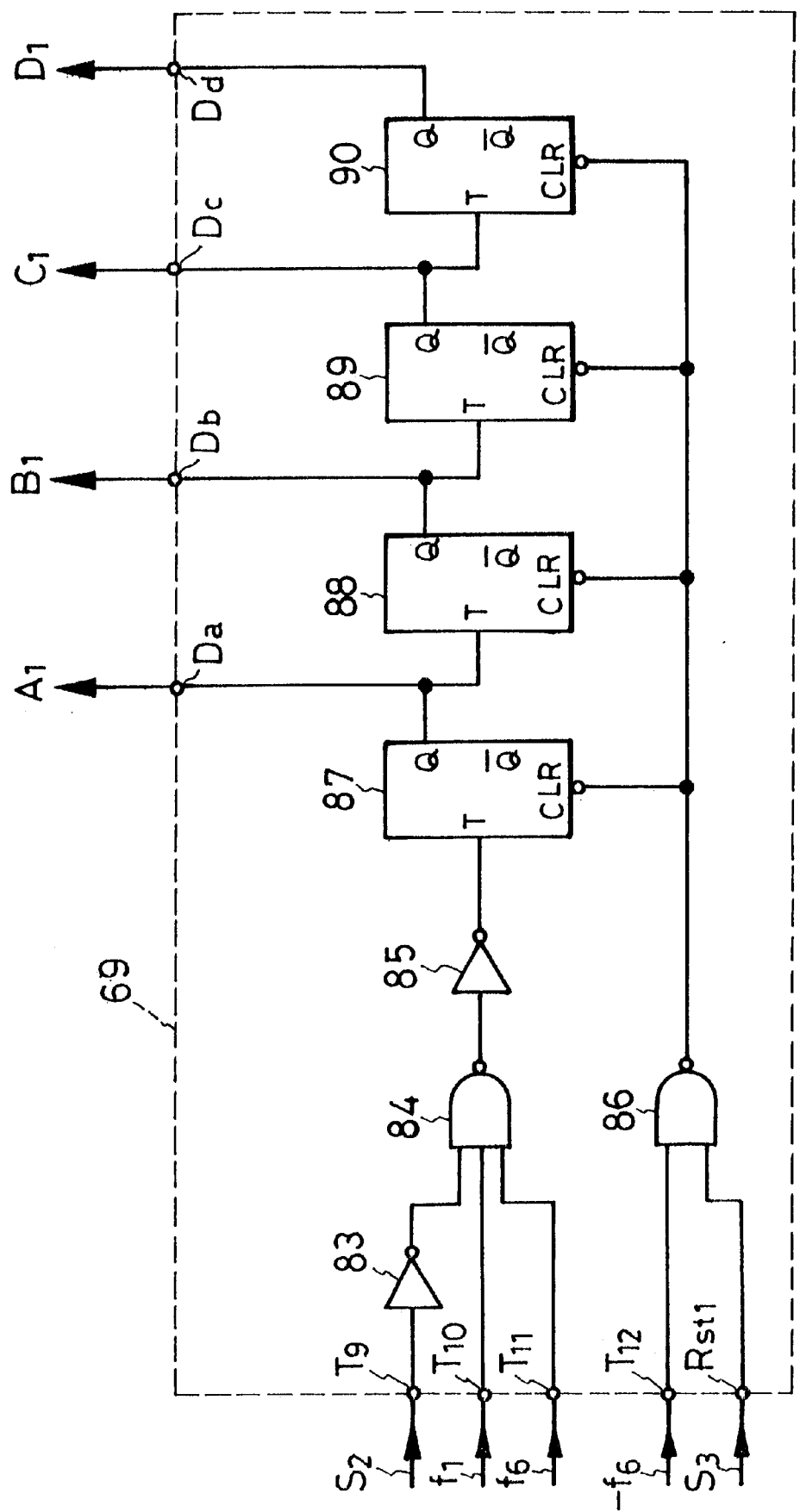
FIG. 5 is a schematic electrical diagram showing in more detail the first down counter included in the FIG. 3 digital integrated circuit.

FIG. 5 is a detailed illustration of the first down counter 69. It includes a NAND gate 84 having a first input connected to the counter input $T_9$ via an inverter 83, a second input connected to the first subclock input $T_{10}$, and a third input connected to the second subclock input $T_{11}$. The inverter 83 inverts the switch state signal $S_2$, shown at (A) in FIG. 11, into the form of FIG. 11(F). Inputting this inversion of the switch state signal $S_2$, the first subclock signal $f_1$, FIG. 11(B), and the sixth subclock signal $f_6$, FIG. 11(C), the NAND gate 84 produces the output seen at (G) in FIG. 11. As will be noted from this FIG. 11(G) waveform, the NAND gate 84 functions to put out an inversion of the first subclock signal $f_1$ during the low state, from $t_o$ to $t_6$, of the switch state signal $S_2$. The low state of this signal indicates that the switching transistor 48, FIG. 2, is on. The number of pulses produced by the NAND gate 84 during the $t_o$–$t_6$ period is therefore proportional to the duration of the on state of the switching transistor.

Since the NAND gate 84 inputs the sixth subclock signal $f_6$, as well, the inversion of the first subclock signal $f_1$ is allowed through the NAND gate only when the sixth subclock signal and the inversion of the switch state signal $S_2$ are both high. As a result, the NAND gate 84 goes high at $t_6$ and remains so even after $t_7$, as at(G) in FIG. 11, when the FIG. 11(A) switch state signal $S_2$ goes low, because then the FIG. 11(C) sixth subclock signal $f_6$ also goes low.

The output of the NAND gate 84 is connected via another inverter 85 to the trigger input T of a trigger flip flop 87, which is in cascade connection with three other similar flip flops 88, 89 and 90. The trigger input to the first flip flop 87 is therefore a FIG. 11(H) inversion of the FIG. 11(G) output from the NAND gate 84. This FIG. 11(H) output from the inverter 85 is a logical product of the FIG. 11(F) output from 11 the inverter 83, FIG. 11(B) first subclock signal $f_1$, and FIG. 11(C) sixth subclock signal $f_6$, so that the NAND gate 84 might be replaced by an AND gate, and the inverter 85 omitted.

The four flip flops 87–90 count in a decreasing direction when triggered by the FIG. 11(H) output pulses of the inverter 85 and, in combination, put out successive counts in the form of a string of four binary digits [$D_1$ $C_1$ $B_1$ $A_1$], where $D_1$ is the most significant digit and $A_1$ the least significant digit. Toward this end the trigger inputs T of the second 88 to fourth 90 flip flops are each connected to the output Q of the preceding stage flip flop. The outputs Q of all the flip flops 87–90 are also connected to the count outputs Da, Db, Dc and Dd of this first down counter 69. The clear inputs CLR of all the flip flops 87–90 are connected to another NAND gate 86. This second NAND gate has an input connected to the third subclock input $T_{12}$ for inputting the inversion $-f_6$ of the sixth subclock signal $f_6$, and another input connected to the reset input $Rst_1$ for inputting the reset signal $S_3$.

The second NAND gate 86 produces, therefore, the FIG. 11(I) output in response to the FIG. 11(D) inverted sixth subclock signal $-f_6$ and the FIG. 11(E) reset signal $S_3$; in this case, the second NAND gate 86 produces a negative reset or clear pulse at $t_7$ for application to the clear inputs CLR of all the flip flops 87–90. The cycle of the FIG. 11(I) reset pulses thus produced is twice as long as that of the FIG. 11(E) reset signal $S_3$ and just as long as that of the sixth subclock signal $f_6$ and of the inversion $-f_6$ thereof.

The showings of (J)–(M) in FIG. 11 presuppose that a reset pulse from the NAND gate 86 cleared all the flip flops 87–90 before $t_o$, making their outputs $A_1$–$D_1$ low until that moment. Then, at $t_o$, the first flip flop 87 is shown triggered by a FIG. 11(H) inverter output pulse, with its output $A_1$ going high as at FIG. 11(J). The other three flip flops 88–90 will then be triggered one after another, their outputs $B_1$–$B_1$ also going high as at FIG. 11(K)–(M). The flip flops 87–90 will count down each time the inverter 85 produces a FIG. 11(H) pulse, as at $t_1$–$t_5$ in FIG. 11. The four bits count $[D_1 C_1 B_1 A_1]$ of this first down counter 69 will change from [1111] to [1110], then to [1101], [1100], [1011] and finally to [1010].

The count of the first down counter 69 is fixed upon expiration of the $t_o$–$t_6$ period, during which the switching transistor 48, FIG. 2, has been on, as at FIG. 1I(A). The count at $t_6$, in this case [1010], will then be held until $t_7$, when the flop flops 87–90 will all be cleared by another FIG. 11(I) output pulse of the NAND gate 86.

FIG. 8 shows at (B) an analog equivalent of the output from the first down counter 69 when the energy requirement from the vehicle loads is constant. A decimal fifteen at FIG. 8(B) corresponds to a binary [1111], and a decimal ten to a binary [1010].

With reference again to FIG. 3 the second down counter 70 of the digital integrated circuit 56 has, in addition to the mentioned reset input $Rst_2$, four count inputs Ea, Eb, Ec and Ed, four count outputs Fa, Fb, Fc and Fd, two subclock inputs $T_{13}$ and $T_{14}$, and another input $T_{15}$. The four count inputs Ea–Ed are connected respectively to the count outputs Da–Dd of the first down counter 69 for inputting the FIG. 11(J)–(M) count outputs $A_1$–$D_1$ therefrom. The subclock inputs $T_{13}$ and $T_{14}$ are connected to the sixth $T_6$ and eighth $T_8$ outputs of the frequency divider 67 for inputting the subclock signals $f_6$ and $f_7$. The input $T_{15}$ is connected to the comparator 52, FIG. 2, of the voltage regulator 40 by way of the conductor 62 for inputting the comparator output pulses $S_1$.

Figure 6:
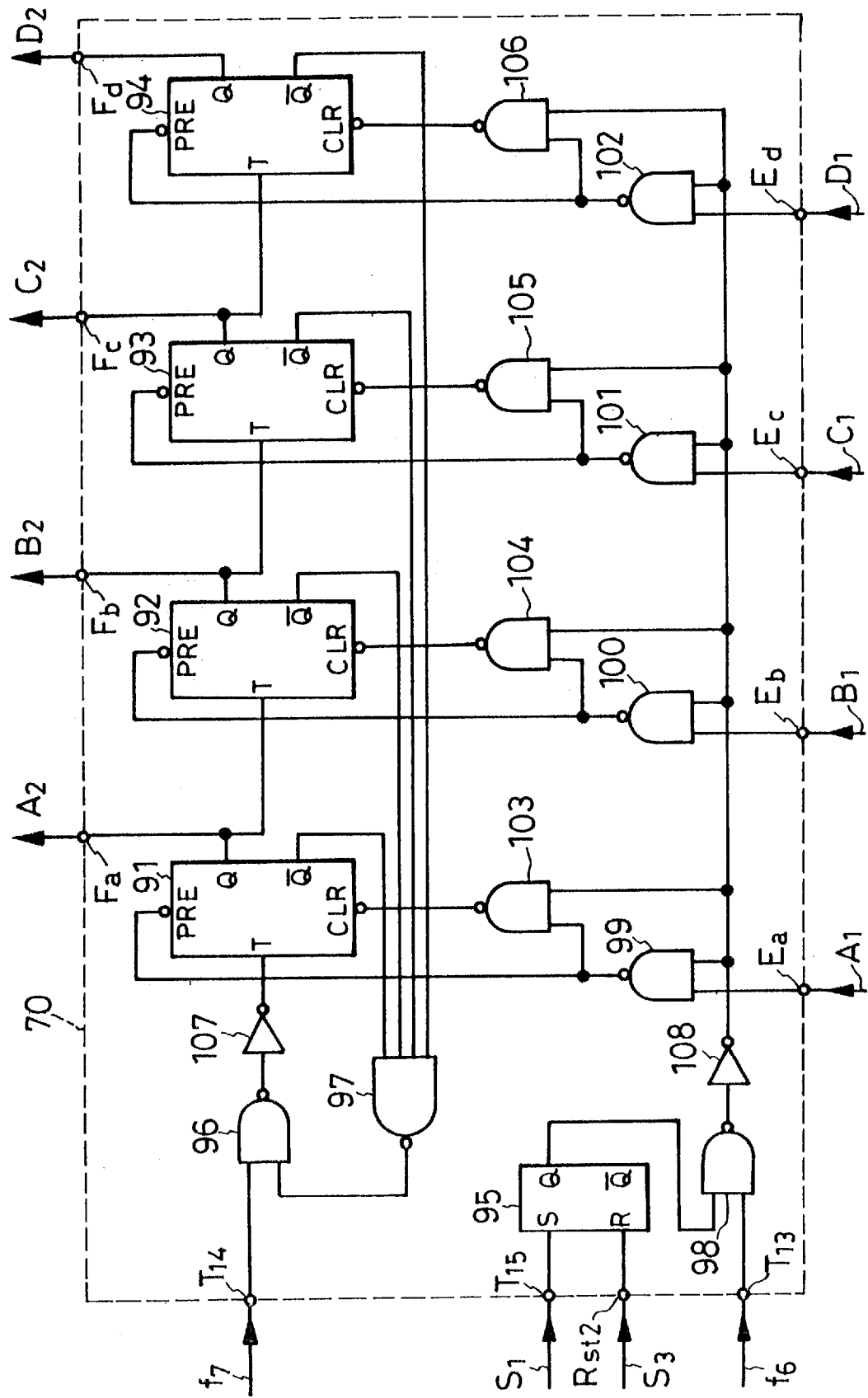
FIG. 6 is a schematic electrical diagram showing in more detail the second down counter included in the FIG. 3 digital integrated circuit.

As illustrated in more detail in FIG. 6, the second down counter 70 comprises a cascade connection of four trigger flip flops 91–94, an RS flip flop 95, eleven NAND gates 96–106, and two inverters 107 and 108. The first stage flip flop 91 has its trigger input T connected to the NAND gate 96 via the inverter 107. The NAND gate 96 has an input connected to the subclock input $T_{14}$, and another input to the NAND gate 97. This NAND gate 97 has four inputs connected respectively to the inverting outputs of the flip flops 91–94.

The second to third stage flip flops 92–94 have their trigger inputs T connected respectively to the outputs Q of the preceding ones 91–93. The outputs Q of all the flip flops 91–94 are also connected respectively to the count outputs Fa–Fd for producing the binary coded count $[D_2 C_2 B_2 A_2]$, where $D_2$ is the most significant bit and $A_2$ the least significant bit.

The other one flip flop 95 of the second down counter 70, which takes part in presetting and clearing the other four 91–94, has a set input S connected to the input $T_{15}$ for inputting the comparator output signal $S_1$, a reset input R connected to the reset input $Rst_2$ for inputting the reset signal $S_3$, and an output Q connected to the NAND gate 98. This NAND gate 98 has another input connected to the input $T_{13}$ for inputting the subclock signal $f_6$, and an output connected to the inverter 108. An AND gate could therefore be employed in substitution for the NAND gate 98 and inverter 108.

Another four NAND gates 99–102 are provided for presetting the flip flops 91–94, and yet another four NAND gates 103–106 for clearing the flip flops 91–94. The NAND gates 99–102 have inputs connected respectively to the counter inputs Ea–Ed for inputting the first down counter outputs $A_1$, $B_1$, $C_1$ and $D_1$, other inputs connected to the inverter 108, and outputs connected respectively to the preset inputs PRE of the flip flops 91–94. The NAND gates 103–16 have inputs connected respectively to the NAND gates 99–102, other inputs connected to the inverter 108, and outputs connected to the clear inputs CLR of the flip flops 91–94.

FIG. 12 shows the input and output waveforms of the second down counter 70 during the steady-state operation of this generator voltage regulating system, when there is practically constant energy requirement from the loads. The moments $t_o$–$t_7$ in FIG. 12 agree with the moments $t_o$–$t_7$ in FIG. 11, which is explanatory of the steady-state operation of the first down counter 69, so that the FIG. 12(A)–(D) waveforms of the first down counter outputs $A_1$–$D_1$ are the same as those of FIG. 11(J)–(M). The second down counter 70 receives at its count inputs Ea–Ed the outputs $A_1$–$D_1$ from the first down counter 69 and, as shown at FIG. 12(I)–(L), produces count outputs $A_2$–$D_2$ from its outputs Fa–Fd. During steady-state operation the second down counter 70 latches the first down counter outputs [1010] of the $t_5$–$t_7$ period and puts them out as its own outputs $[D_2 C_2 B_2 A_2]$.

FIGS. 13 and 14 are explanatory of how the second down counter 70 normally produces the same count outputs as does the first down counter 69 during the $t_5$–$t_7$ period. The FIG. 13(A)–(D) waveforms are the same as those of FIG. 11(J)–(M) and hence of FIGS. 12(A)–(D). At FIG. 13(F) a reset pulse $S_3$ is shown to appear, as will be understood by referring also to FIG. 10(J). The flip flop 95 at $t_o$ will be reset by this pulse, as at FIG. 13(G). Then the flip flop 95 will be set, and go high, at $t_6$ when the comparator 52, FIG. 2, delivers a pulse $S_1$ to its set input S as at FIG. 13(E). The flip flop 95 will remain set until $t_7$ when another reset pulse $S_3$ is produced.

The NAND gate 98 will provide the FIG. 13(1) output based on the FIG. 13(G) output from the flip flop 95 and the FIG. 13(H) subclock signal $f_6$. The inverter 108 will invert this NAND gate output into the form of FIG. 13(J). The four NAND gates 99–102 will then provide the outputs of FIG. 13(K)–(N) based on the FIG. 13(A)–(D) outputs $A_1$–$D_1$ from the first down counter 69 and the FIG. 13(J) output from the inverter 108, for delivery to the preset inputs PRE of the flip flops 91–94, respectively.

As will be noted from FIG. 13(K) and (M), the NAND gates 99 and 101 will remain high irrespective of change in the output from the inverter 108. However, as indicated at FIG. 13(L) and (N), the NAND gates 100 and 102 will go low at $t_6$, when the inverter 108 goes high, and remain so until $t_7$. For this reason the second and fourth stage flip flops 92 and 94 will be preset at $t_6$, and their outputs $B_2$ and $D_2$ will go high.

How the flip flops 91–94 are cleared will be understood from a study of FIG. 14. Connected to the clear terminals CLR of the flip flops 91–94, the NAND gates 103–106 input the FIG. 14(A) output from the inverter 108 and the FIG. 14(B)–(E) outputs from the NAND gates 99–102. FIG. 14(F)–(I) show the resulting outputs from the NAND gates 103–106, which are applied to the clear terminals CLR of the flip flops 91–94. FIG. 14(F) and (H) indicate that the NAND gates 103 and 105 go low at $t_6$, when the inverter 108 goes high as at FIG. 14(A), and remain so until $t_7$. According to FIG. 14(G) and (1), however, the NAND gates 104 and 106 remain high in the face of the $t_6$ change in the output from the inverter 108. The first and third stage flip flops 91 and 93 will be cleared at $t_6$.

As has been explained above with reference to FIGS. 13 and 14, the second and fourth stage flip flops 92 and 94 will be preset, and the first and third stage flip flops 91 and 93 cleared, at $t_6$. Consequently, as indicated at FIG. 12(I)–(L), the outputs $A_2$–$D_2$ from the second down counter 70 will be 0, 1, 0 and 1, respectively. Rewritten in the order of [$D_2$ $C_2$ $B_2$ $A_2$], the outputs will be [1010], or ten according to the decimal system of notation. The flip flops 92 and 94 will remain preset, and the flip flops 91 and 93 cleared, throughout the normal state of operation, causing the second down counter 70 to continue production of the steady-state output [1010].

Further, since the inverted outputs from the flip flops 91–94 are never all high during steady-state operation, the NAND gate 97 of the second down counter 70 will remain high, as at FIG. 17(B). Inputting this constantly high output from the NAND gate 97, the NAND gate 96 and inverter 107 will produce the outputs of FIG. 17(C) and (D) in response to the FIG. 17(A) subclock signal $f_7$. The inverter 107 will thus trigger the flip flop 91 at the repetition rate of the subclock signal $f_7$. As has been set forth, however, the flip flops 91 and 93 will be cleared, and the flip flops 92 and 92 preset, at the repetition rate of the subclock signal $f_6$ which is higher than that of the subclock signal $f_7$, so that this latter signal will cause no down counting of the second down counter 70. Normally, the second down counter 70 functions merely to hold the incoming count from the first down counter 69.

It will now be explained how the second down counter 70 operates in the event of an abrupt rise in energy requirement from the loads, Then, as has been mentioned in connection with FIG. 9, the output voltages of the generator 10 and rectifier 17 will drop, and so will the voltage across the battery 36. With the resulting decrease in the sensed generator voltage Va, the comparator 52, FIG. 2, of the voltage regulator 40 will remain low for some extended period of time, as will be understood from FIG. 9(A) and (B).

FIGS. 15–17 are explanatory of the operation of the second down counter 70 in the event where the comparator 52 does not produce a pulse $S_1$ more than one period of the subclock pulse signal $f_7$. No change in the state of the flip flop 95, FIG. 6, of the second down counter 70 will take place, as at FIG. 15(G), as long as the comparator 52 puts out no pulse $S_1$ as at FIG. 15(E). The NAND gates 99–102 will then remain high, as at FIG. 15(K)–(N), not presetting the flip flops 91–94. The NAND gates 103–16 will also remain high, as at FIG. 16(F)–(I). The flip flops 91–94 will therefore be neither preset nor cleared but respond only to the subclock signal $f_7$, as will be detailed hereafter with reference to FIG. 17.

It is understood that the complete generator voltage regulating system has been operating in steady-state mode before $t_o$ in FIG. 17, with the second down counter 70 continuing the production of the steady-state output [1010]. The NAND gate 97 has been high, as at FIG. 17(B).

Then the FIG. 17(A) subclock signal $f_7$ will be inverted by the NAND gate 96 into the form of FIG. 17(C) and reinverted by the inverter 107 into the form of FIG. 17(D). These inverter output pulses, which are equivalent to the FIG. 17(A) subclock pulses, will be directed into the trigger input T of the first stage flip flop 91, FIG. 6. Triggered by the leading edge of each incoming pulse, the flip flop 91 will change its output $A_2$ as at FIG. 17(E). The succeeding flip flops 92–94 will be each likewise triggered by the leading edge of each output from the preceding flip flop, producing the outputs $B_2$–$D_2$ as at FIG. 17(F)–(H).

Down counting has thus occurred in the second down counter 70. Its binary coded outputs [$D_2$ $C_2$ $B_2$ $A_2$] will be [1001] from $t_o$ to $t_1$, [1000] from $t_1$ to $t_2$, [0111] from $t_2$ to $t_3$, [0110] from $t_3$ to $t_4$, [0101] from $t_4$ to $t_5$, and [0100] after $t_5$. FIG. 17(I) indicates the decimal equivalents of these binary outputs from the second down counter 70. It will be observed that the decimal output from the second down counter 70 decreases with each subclock pulse $f_7$. This second down counter output is utilized to determine the conducting periods of the switching transistor 48 in a manner described hereinbelow.

A reference back to FIG. 3 will show that the count outputs $A_2$–$D_2$ from the second down counter 70 are directed respectively into the count inputs Ga, Gb, Gc and Gd of the duration modulated pulse generator 71. This pulse generator 71 has four subclock inputs Ha, Hb, Hc and Hd as well, which are connected respectively to the subclock outputs $T_2$, $T_3$, $T_4$ and $T_5$ for inputting the subclock pulses $f_2$–$f_5$. The pulse generator 71 generates the second duration modulated pulse signal $S_4$ at the repetition rate of the fifth subclock signal $f_5$. The signal $S_4$ is delivered from the output $T_{16}$ to the NOR gate 57, FIG. 2, over the conductor 65.

Figure 7:
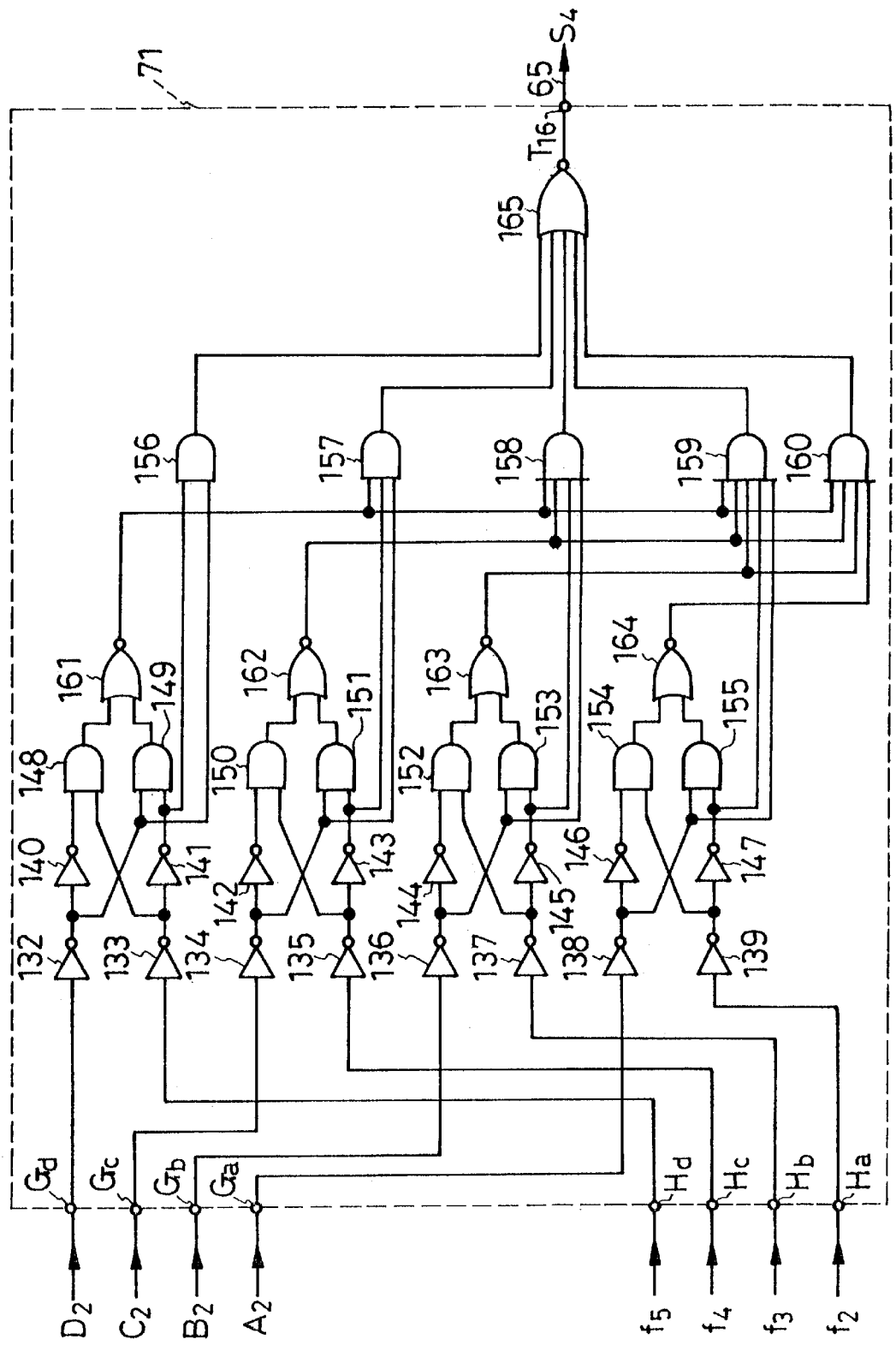
FIG. 7 is a schematic electrical diagram showing in more detail the duration modulated pulse generator included in the FIG. 3 digital integrated circuit.

As illustrated in detail in FIG. 7, the duration modulated pulse generator 71 comprises sixteen inverters 132–147, thirteen AND gates 148–160, and five NOR gates 161–165. No detailed explanation of the connections of these circuit components are considered necessary because this pulse generator is a digital comparator of itself familiar make.

Functionally, the duration modulated pulse generator 71 compares the four bits count output [$D_2$ $C_2$ $B_2$ $A_2$] from the second down counter 70 against the four bits reference number [$f_5$ $f_4$ $f_3$ $f_2$] consisting of the subclock pulses $f_2$–$f_5$ from the frequency divider 67. The pulse generator 71 goes low when [$f_5$ $f_4$ $f_3$ $f_2$]$\geq$[$D_2$ $C_2$ $B_2$ $A_2$], and high when [$f_5$ $f_4$ $f_3$ $f_2$]<[$D_2$ $C_2$ $B_2$ $A_2$].

FIG. 18 shows the inputs to, and outputs from, the duration modulated pulse generator 71 during steady-state system operation. The FIG. 18(E)–(H) count outputs $A_2$–$D_2$ from the second down counter 70 are constantly 0, 1, 0 and 1, respectively. Rewritten in the order of [$D_2$ $C_2$ $B_2$ $A_2$], the second down counter outputs are [1010], which is equivalent to a decimal ten. As indicated at FIG. 18(A)–(D), on the other hand, the four bits reference number [$f_5$ $f_4$ $f_3$ $f_2$] is shown to change progressively from [1111] to [0000] at time intervals $t_o$, $t_1$, $t_2$, . . . $t_7$ equal to the repetition rate of the subclock pulses $f_2$. FIG. 18(I) indicates that the output $S_4$ from the duration modulated pulse generator 71 is low from $t_0$ to $t_6$ because then $[f_5\ f_4\ f_3\ f_2] \geq [D_2\ C_2\ B_2\ A_2] = [1010]$, and high from $t_6$ to $t_7$ because then $[f_5\ f_4\ f_3\ f_2] < [D_2\ C_2\ B_2\ A_2]$.

The above output $S_4$ from the pulse generator 71 is what is herein termed the second duration modulated pulse signal, with a cycle $t_o$–$t_7$ that repeats itself in synchronism with that of the subclock signal $f_5$. During steady-state system operation, however, this signal $S_4$ is not intended to make direct on-off control of the switching transistor 48 but to enable the switching thereof by the first duration modulated pulse signal from the flip flop 55.

As represented in FIG. 17, upon rapid rise in energy requirement by the loads, the output count $[D_2\ C_2\ B_2\ A_2]$ from the second down counter 70 will decrement, in terms of the decimal equivalent thereof given at FIG. 17(I), at the cycles of the subclock signal $f_7$. Consequently, as indicated by the dashed lines at FIG. 18(I), the duration modulated pulse generator 71 will go high at progressively later moments, with the low state of each pulse cycle becoming longer, and the switching transistor 48 held on for successively longer periods of time.

As has been discussed in connection with FIG. 9, the sensed generator voltage Va may drop so much in the event of an abrupt rise in energy requirement by the loads that it will not rise back to the reference voltage Vr within one cycle of the subclock signal $f_7$. Then the comparator 52 will produce no pulses, as at FIG. 9(B), during the $t_o$–$t_7$ period when the sensed generator voltage Va is less than the reference voltage Vr. The flip flop 55, FIG. 2, will remain low during that period, not producing the first duration modulated pulse signal.

Instead, the second duration modulated pulse signal $S_4$ will be produced, as indicated by the dashed lines at FIG. 18(I), on the output conductor 65, FIGS. 2 and 3, of the digital integrated circuit 56. Inverted by the NOR gate 57, the second duration modulated pulse signal $S_4$ will be utilized for switching control of the transistors 48 and 49. The switching cycle of the transistors 48 and 49 at this time is the same as the cycle of the fifth subclock signal $f_5$, less than that of the eighth subclock signal $f_7$. Switched by the second duration modulated pulse signal $S_4$, the transistor 48 will have its duty ratio changed from 37.50% to 75.00% through intermediate steps of 43.75%, 50.00%, 56.25%, 62.50%, and 68.75%, as at FIG. 9(D), for gradually, rather than instantly, meeting the energy requirement of the loads. The generator 10 will make no suddenly high engine output torque demand, so that the engine 13 will suffer no sharp drop in rpm, enabling the motor vehicle to travel smoothly.

As has been detailed hereinabove, the present invention requires, in essence, only the digital integrated circuit 56 comprised of the two down counters 69 and 70 and digital comparator 71, for smoothly returning to normal the output voltages of the generator 10 and rectifier 17 and the voltage of the battery 36 after a sudden increase in energy requirement by the loads.

It will also have been understood that the generator voltage regulating system according to this invention operates in two different modes, the steady-state mode in which the switching transistors 48 and 49 are controlled by an inversion of the first duration modulated pulse signal from the flip flop 55, and the emergency recovery mode in which the switching transistors are controlled by an inversion of the second duration modulated pulse signal $S_4$ from the digital integrated circuit 56.

A further important feature of this invention is that smooth, optimal switching is assured between the above two modes with use of very simple circuit means. In steady-state mode, not only are the transistors 48 and 49 switched by the first duration modulated pulse signal from the flip flop 55, as above, but also the second duration modulated pulse signal $S_4$, which varies its state according to whether the switching transistor 48 is on or off, is concurrently produced by the digital integrated circuit 56 for application to the NOR gate 57. Therefore, at the time of sudden rise in load energy requirement, the digital integrated circuit 56 holds the switching information of the transistor 48 just before that time and so is enabled to smoothly increment the duty ratio of the transistor on the basis of its steady state duty ratio. The control of the switching transistor by the first duration modulated pulse signal is automatically resumed upon return of the sensed generator voltage Va to the reference voltage Vr.

Notwithstanding the foregoing detailed disclosure it is not desired that the present invention be limited by the exact showing of the drawings or the description thereof; instead, the invention should be construed broadly and in a manner consistent with the fair meaning or proper scope of the attached claims. The following is a brief list of possible modifications of the illustrated embodiments which are all believed to fall within the scope of this invention:

1. The a.c. generator 10, FIG. 1, together with the rectifier 17 could be replaced by a d.c. generator.
2. The diodes 24, 25 and 26, FIG. 1, of the rectifier 17 could be omitted, and the d.c. output conductor 34 connected to the output 30.
3. The transistors 48 and 49 could be each replaced by a field effect transistor, and the drain voltage thereof could be sensed to provide the switch state signal $S_2$.
4. The NOR gate 57, FIG. 2, of the voltage regulator 40 could be replaced by an AND gate, with one input of the AND gate connected to the inverting output of the flip flop 55, and another input to the $S_4$ output of the digital integrated circuit 56 via an inverter.

What is claimed is:

1. A system for regulating the output voltage of a generator having a field winding and an output winding, comprising:
   (a) a switch to be connected in series with the field winding of the generator for on-off control of excitation thereof;
   (b) voltage sensing means to be connected to the output winding of the generator for sensing the output voltage thereof;
   (c) a source of a reference voltage;
   (d) a comparator connected to the voltage sensing means and the reference voltage source for providing an output signal indicative of whether the sensed generator voltage is higher than the reference voltage or not;
   (e) reset means for generating a series of reset pulses at a prescribed recurrence rate;
   (f) first pulse generating means connected to the comparator and the reset means for producing a first duration modulated pulse signal which gains a state in response to each reset pulse, and a second state when the sensed generator voltage is higher than the reference voltage, the first duration modulated pulse signal being produced only as long as the sensed generator voltage grows higher than the reference voltage during each cycle of the reset pulses;
   (g) switch state sensing means connected to the switch for providing a switch state signal indicative of whether the switch is on or off;

(h) counter means connected to the switch state sensing means and the reset means for ascertaining the length of each switch-on period during which the switch is on;

(i) switch-on period determination means connected to the comparator and the reset means and the counter means for providing an output that represents the ascertained length of the latest switch-on period when the sensed generator voltage grows higher than the reference voltage during each cycle of the reset pulses, and that represents a series of predetermined incremental switch-on periods when the sensed generator voltage does not grow higher than the reference voltage during each cycle of the reset pulses;

(j) second pulse generating means connected to the switch-on period determination means for producing a second duration modulated pulse signal indicative of the switch-on periods represented by the output from the switch-on period determination means; and (k) switch control means connected to the first and the second pulse generating means for on-off control of the switch by the first duration modulated pulse signal when the sensed generator voltage grows higher than the reference voltage during each cycle of the reset pulses, and by the second duration modulated pulse signal when the sensed generator voltage does not grow higher than the reference voltage during each cycle of the reset pulses.

2. The generator voltage regulating system of claim 1 wherein the first pulse generating means comprises a flip flop having a set input connected to the comparator, and a reset input connected to the reset means.

3. The generator voltage regulating system of claim 1 wherein the counter means comprises:

(a) clock means for producing clock pulses at a recurrence rate higher than that of the reset pulses; and (b) a down counter connected to the switch state sensing means and the reset means and the clock means for producing a count output that is at a maximum when the switch goes on, that decrements in response to the clock pulses during each on period of the switch, and that remains, during each off period of the switch, at the count when the switch previously went off.

4. The generator voltage regulating system of claim 3 wherein the switch-on period determination means is a second down counter.

5. The generator voltage regulating system of claim 4 which further comprises second clock means for producing a second series of clock pulses at a recurrence rate lower than that of the reset pulses, and third clock means for producing a third series of clock pulses at a recurrence rate lower than that of the second series of clock pulses, and wherein the second down counter comprises:

(a) a plurality of trigger flip flops in concatenation;

(b) output means connected to the trigger flip flops for producing the count output;

(c) a control flip flop having a set input connected to the comparator, and a reset input connected to the reset means;

(d) first logic circuit means connected to the second clock means and the control flip flop for producing an output that changes in state with an output from the control flip flop when the sensed generator voltage grows higher than the reference voltage within each cycle of the reset pulses, and that does not change in state when the sensed generator voltage does not grow higher than the reference voltage within each cycle of the reset pulses;

(e) second logic circuit means connected to the first recited down counter and the first logic circuit means and the trigger flip flops for causing the trigger flip flops to hold the count output from the first down counter when the sensed generator voltage grows higher than the reference voltage within each cycle of the reset pulses, and for disabling the trigger flip flops from holding the count output from the first down counter when the sensed generator voltage does not grow higher than the reference voltage within each cycle of the reset pulses; and (f) third logic circuit means connected between the third clock means and the concatenation of trigger flip flops for triggering the trigger flip flops by the third series of clock pulses when the sensed generator voltage does not grow higher than the reference voltage within each cycle of the reset pulses.

6. The generator voltage regulating system of claim 1 wherein the second pulse generating means comprises:

(a) reference generating means for generating a series of reference values at the same cycle as that of the reset pulses; and (b) logic circuit means connected to the switch-on period determination means and the reference generating means for generating the second duration modulated pulse signal through comparison of the output from the switch-on period determination means and the series of reference values from the reference generating means.

7. The generator voltage regulating system of claim 1 wherein the switch control means comprises a logic gate.

8. The generator voltage regulating system of claim 1 wherein the generator is an alternating current generator having a rectifier connected to the output winding, and wherein the voltage sensing means comprises resistor means connected to the rectifier.

9. A motor vehicle electrical system for supplying electrical loads on the vehicle, comprising:

(a) a generator to be driven by an engine of a motor vehicle, the generator having a field winding and an output winding;

(b) a switch connected in series with the field winding of the generator for on-off control of excitation thereof;

(c) voltage sensing means connected to the output winding of the generator for sensing the output voltage thereof;

(d) a source of a reference voltage;

(e) a comparator connected to the voltage sensing means and the reference voltage source for providing an output signal indicative of whether the sensed generator voltage is higher than the reference voltage or not;

(f) reset means for generating a series of reset pulses at a prescribed recurrence rate;

(g) a flip flop having a set terminal connected to the comparator and a reset terminal connected to the reset means for producing a first duration modulated pulse signal which gains a first state in response to each reset pulse, and a second state when the sensed generator voltage is higher than the reference voltage, the first duration modulated pulse signal being produced only as long as the sensed generator voltage grows higher than the reference voltage during each cycle of the reset pulses;

(h) switch state sensing means connected to the switch for providing a switch state signal indicative of whether the switch is on or off;

(i) clock means for producing clock pulses at a recurrence rate higher than that of the reset pulses;

(j) a first down counter connected to the reset means and the switch state sensing means and the clock means for ascertaining the length of each switch-on period during which the switch is on, the first down counter producing a count output that is at a maximum when the switch goes on, that decrements in response to the clock pulses during each on period of the switch, and that remains, during each off period of the switch, at the count when the switch previously went off;

(k) a second down counter connected to the comparator and the reset means and the first down counter for providing an output that represents the ascertained length of the latest switch-on period when the sensed generator voltage grows higher than the reference voltage during each cycle of the reset pulses, and that represents a series of predetermined incremental switch-on periods when the sensed generator voltage does not grow higher than the reference voltage during each cycle of the reset pulses;

(l) a duration modulated pulse generator connected to the second down counter for producing a second duration modulated pulse signal indicative of the switch-on periods represented by the output from the second down counter; and (m) a logical gate connected to the flip flop and the duration modulated pulse generator for on-off control of the switch by the first duration modulated pulse signal when the sensed generator voltage grows higher than the reference voltage during each cycle of the reset pulses, and by the second duration modulated pulse signal when the sensed generator voltage does not grow higher than the reference voltage during each cycle of the reset pulses.

10. The motor vehicle electrical system of claim 9 wherein the first and the second down counter and the duration modulated pulse generator are incorporated in a digital integrated circuit.

* * * * *